(12) United States Patent
Wang et al.

(10) Patent No.: US 11,157,527 B2
(45) Date of Patent: Oct. 26, 2021

(54) CREATING CLEAN MAPS INCLUDING SEMANTIC INFORMATION

(71) Applicant: Zoox, Inc., Menlo Park, CA (US)

(72) Inventors: Zeng Wang, Menlo Park, CA (US); Nitesh Shroff, Millbrae, CA (US); Dragomir Dimitrov Anguelov, San Francisco, CA (US); Subhasis Das, Menlo Park, CA (US); Jesse Sol Levinson, Redwood City, CA (US); Brice Rebsamen, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 397 days.

(21) Appl. No.: 15/900,319

(22) Filed: Feb. 20, 2018

(65) Prior Publication Data

US 2019/0258737 A1    Aug. 22, 2019

(51) Int. Cl.
| | |
|---|---|
| *G06F 16/28* | (2019.01) |
| *G06F 16/23* | (2019.01) |
| *G06N 20/00* | (2019.01) |
| *G06F 16/29* | (2019.01) |
| *G06T 7/11* | (2017.01) |

(Continued)

(52) U.S. Cl.
CPC ........... *G06F 16/287* (2019.01); *G01C 21/32* (2013.01); *G06F 16/2379* (2019.01); *G06F 16/29* (2019.01); *G06K 9/00791* (2013.01); *G06N 20/00* (2019.01); *G06T 7/11* (2017.01)

(58) Field of Classification Search
CPC .... G06F 16/287; G06F 16/2379; G06F 16/29; G06T 7/11; G06N 20/00; G01C 21/32; G06K 9/00791
See application file for complete search history.

(56) References Cited

U.S. PATENT DOCUMENTS 6,102,864 A  *  8/2000  Hatfield ................... A61B 8/06
                                                             600/454
8,379,020 B2    2/2013  Clifton
(Continued)

FOREIGN PATENT DOCUMENTS

EP         3078935  A1    10/2016

OTHER PUBLICATIONS

The PCT Invitation to Pay Additional Fees, dated Feb. 15, 2019, for PCT Application No. PCT/US18/59304, 12 pages.
(Continued)

*Primary Examiner* — Jensen Hu
(74) *Attorney, Agent, or Firm* — Lee & Hayes, P.C.

(57) ABSTRACT

A system may receive a sensor dataset representing an environment and use the dataset to create or update a map. In creating or updating the map, the system may determine an object classification of one or more detected objects and only selectively incorporate data into the map based at least in part on the classification. The map may be associated with the classification (or semantic) information of the objects, as well as weights based on the classification. Similarly, datasets with selected classes of data removed may be used for system localization. Further, the system may determine an object track of the objects. When updating the map, voxels in a voxel space may indicate an occupied voxel based on a threshold number of observances. The object track and clean map can then be used for controlling an autonomous vehicle.

20 Claims, 8 Drawing Sheets

(51) Int. Cl.
*G06K 9/00* (2006.01)
*G01C 21/32* (2006.01)

(56) References Cited

U.S. PATENT DOCUMENTS

| | | | |
|---|---|---|---|
| 8,655,079 | B2 | 2/2014 | Saisan |
| 8,811,748 | B2 | 8/2014 | Morris |
| 8,913,784 | B2 | 12/2014 | Collard et al. |
| 9,110,163 | B2 | 8/2015 | Rogan |
| 9,523,772 | B2 | 12/2016 | Rogan et al. |
| 9,633,483 | B1 | 4/2017 | Xu et al. |
| 9,710,714 | B2 | 7/2017 | Chen et al. |
| 10,209,718 | B2 | 2/2019 | Tiwari et al. |
| 10,514,462 | B2 | 12/2019 | Englard et al. |
| 10,592,805 | B2 | 3/2020 | Groh et al. |
| 2006/0151223 | A1 | 7/2006 | Knoll |
| 2009/0292468 | A1 | 11/2009 | Wu et al. |
| 2011/0202538 | A1* | 8/2011 | Salemann ............... G06F 16/29 707/741 |
| 2014/0309841 | A1* | 10/2014 | Hara ...................... G05D 1/024 701/26 |
| 2014/0368807 | A1 | 12/2014 | Rogan |
| 2016/0154999 | A1 | 6/2016 | Fan et al. |
| 2017/0193312 | A1 | 7/2017 | Ai et al. |
| 2017/0220876 | A1 | 8/2017 | Gao et al. |
| 2017/0248963 | A1 | 8/2017 | Levinson et al. |
| 2017/0359561 | A1* | 12/2017 | Vallespi-Gonzalez ...................... G06T 7/593 |
| 2018/0012370 | A1 | 1/2018 | Aghamohammadi et al. |
| 2018/0136332 | A1 | 5/2018 | Barfield, Jr. et al. |
| 2018/0188059 | A1* | 7/2018 | Wheeler ............... B60W 40/04 |
| 2018/0232947 | A1* | 8/2018 | Nehmadi .............. G06T 3/4007 |
| 2018/0364717 | A1 | 12/2018 | Douillard et al. |
| 2019/0114481 | A1 | 4/2019 | DeChant et al. |
| 2019/0147331 | A1 | 5/2019 | Arditi |
| 2019/0156485 | A1 | 5/2019 | Pfeiffer |
| 2019/0178988 | A1 | 6/2019 | Englard et al. |
| 2020/0126237 | A1 | 4/2020 | Pfeiffer |

OTHER PUBLICATIONS

Office Action for U.S. Appl. No. 15/622,905, dated Mar. 7, 2019, Douillard et al., "Voxel Based Ground Plane Estimation and Object Segmentation", 7 pages.
Piewak et al., "Boosting LiDAR-Based Semantic Labeling by Cross-modal Training Data Generation", Published Apr. 26, 2018, by Springer, International Publishing, in Serious Games, part VI, Sections 3.3, 3.4, 16 pages.
Varga et al., "Super-sensor for 360-degree environment perception: Point cloud segmentation using image features", 2017 IEEE 20th International Conference on Intelligent Transportation Systems (ITSC), IEEE, Oct. 16, 2017, sections III.A, III.B, IV.C, IV.D, pp. 1-8.
Xiao et al., "CRF based Road Detection with Multi-Sensor Fusion", 2015 IEEE Intelligent Vehicles Symposium (IV), IEEE, Jun. 28, 2015 (Jun. 28, 2015), pp. 192-198.
Office Action dated May 16, 2019 in U.S. Appl. No. 15/820,245 Pfeiffer," Sensor Data Segmentation", 7 pages.
The PCT Search Report and Written Opinion dated Apr. 11, 2019, for PCT Application No. PCT/US2018/059304, 18 pages.
The PCT Search Report and Written Opinion dated Apr. 2, 2019 for PCT Application No. PCT/US2019/016968, 14 pages.
PCT Search Report and Written Opinion dated Apr. 11, 2019, for PCT Application No. PCT/US2018/059304, 18 pages.
PCT Search Report and Written Opinion dated Apr. 2, 2019, for PCT Application No. PCT/US2019/016968, 14 pages.
Asvadi et al., "Two-Stage Static Dynamic Environment Modeling using Voxel Representation", Robot 2015, Second Iberian Robotics Conf, Nov. 2015, 12 pgs.
Azim et al., "Detection, Classification and Tracking of Moving Objects in a 3D Environment", 2012 Intelligent Vehicles Symposium, 3 pages.
Byun et al., "Toward Accurate Road Detection in Challenging Environments Using 30 Point Clouds", ETRI Journal, vol. 37, No. 3, Jun. 2015, 6 pages.
Lehtomaki et al., "Object Classification and Recognition From Mobile Laser Scanning Point Clouds in a Road Environment", IEEE Transactions On Geoscience and Remote Sensing, vol. 54, No. 2, Feb. 2016, 7 pages.
Morton et al., "An Evaluation of Dynamic Object Tracking with 3D LIDAR", Proceedings Australasian Conf on Robotics and Automation, Dec. 2011, 20 pgs.
Na et al., "The Ground Segmentation of 30 LIDAR Point Cloud with the Optimized Region Merging", 2013 International Conference on Connected Vehicles and Expo (ICCVE), IEEE, Dec. 2, 2013, 3 pgs.
The PCT Search Report and Written Opinion dated Aug. 31, 2018, for PCT Application No. PCT/US18/36410, 14 pages.
Non Final Office Action dated Mar. 18, 2020 for U.S. Appl. No. 16/716,960 "Sensor Data Segmentation" Pfeiffer, 8 pages.

* cited by examiner

CREATING CLEAN MAPS INCLUDING SEMANTIC INFORMATION

BACKGROUND

Virtual maps, such as digital two- and three-dimensional maps, have numerous uses. For example, autonomous vehicles may use virtual maps to determine the position and/or orientation of the vehicle and/or to travel between geographic locations. Some such maps may be created based at least partially on data obtained from sensors that pass through and detect objects in the environment, such as, for example, roads, buildings, traffic signs and signals, other vehicles, parked cars, vegetation, pedestrians, cyclists, etc. However, the sensors may generate data that is undesirable for use in the map and/or that includes a significant amount of extraneous information, thereby resulting in inefficient use of computer processing capacity and memory, which may also result in undesirably slow calculations, and sometimes inaccurate information, when used for control by the autonomous vehicle.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
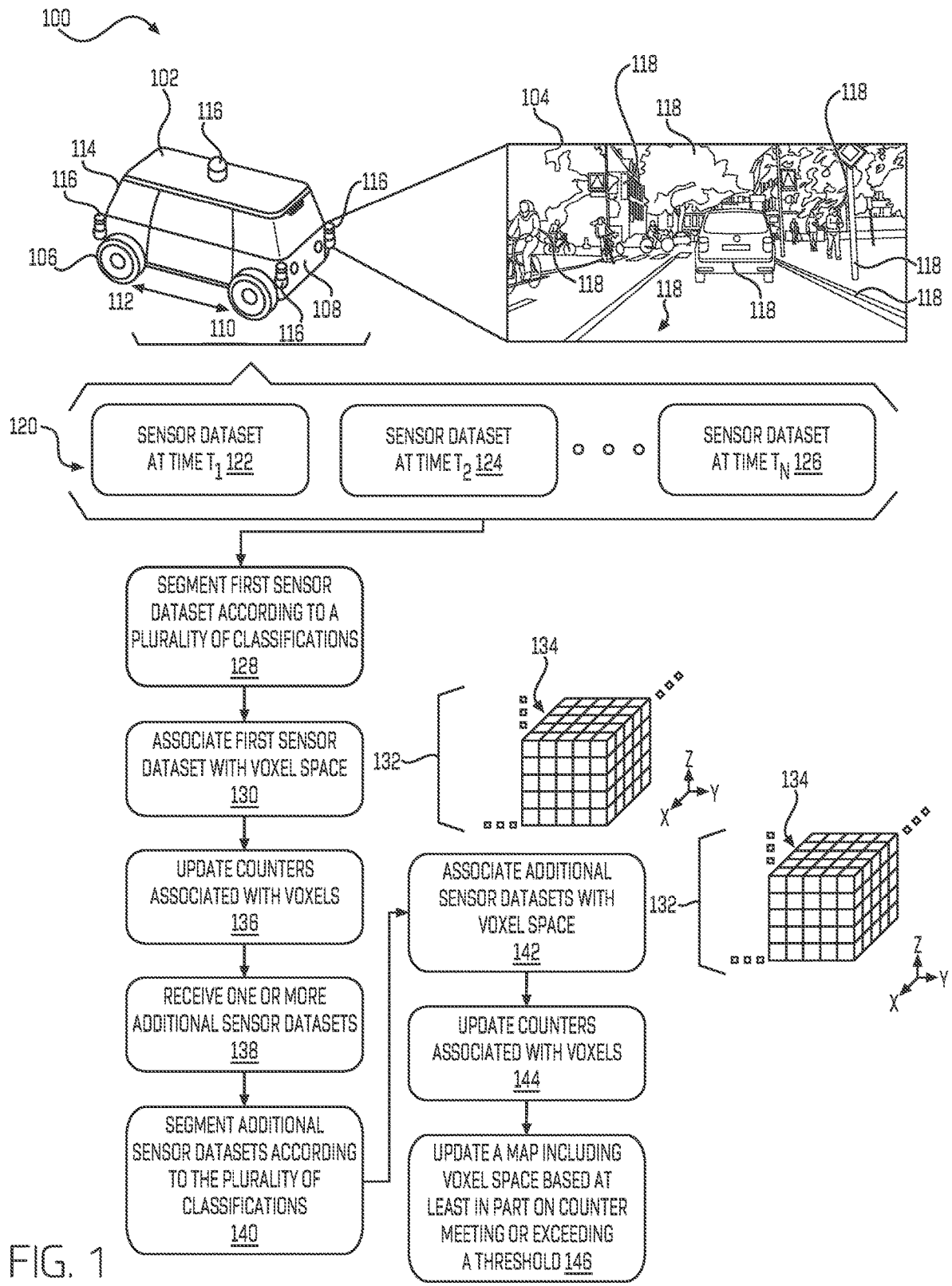
FIG. 1 is a pictorial flow diagram of an example process for updating a map.

This disclosure is generally directed to methods, apparatuses, and systems for creating clean maps, such as virtual maps, cleaning existing maps, and/or adding semantic information to maps. Such maps may be used for determining the position and/or orientation (e.g., the local pose) of vehicles, such as autonomous vehicles, and/or for navigating vehicles between geographic locations. For example, maps may be created based at least in part on data obtained from sensors. In some examples, undesirable artifacts (e.g., objects which may negatively impact the utility of the map) are automatically omitted during creation of the maps. For example, dynamic objects, such as vehicles, pedestrians, and cyclists, may be automatically omitted from the maps as the maps are created as these types of objects may move, which may impact localization. In some examples, existing maps may be automatically cleaned. For example, dynamic objects and/or artifacts created by sensor data associated with dynamic objects may be removed from existing maps using sensor data obtained during subsequent passes of one or more sensors through the environment represented by the map. In some examples, clean maps may be automatically created and/or existing maps may be automatically cleaned by segmenting sensor data and omitting and/or removing dynamic objects and/or artifacts associated with dynamic objects from the maps. In some examples, each semantic class represented in the map may be associated with a contribution weight (e.g., indicative of the amount of data associated with that class that contributes to a particular algorithm, such as, for example, a localization algorithm). As a non-limiting example, potentially dynamic objects, such as, for example, vegetation (e.g., trees and bushes) may be down-weighted, for example, such that detection of their presence is relied on to a lesser extent than static objects, for determining local pose based on the maps. At least some of the above-noted examples may result in improved maps that may be used more efficiently by autonomous vehicles, thereby reducing computer processor capacity requirements and/or memory requirements. This, in turn, may result in improved operation of autonomous vehicles using the maps, for example, such that determinations based at least in part on map data may be more quickly calculated, which may result in improved control of vehicles that use the map data. Further, though discussed in the context of creating maps for aiding navigation of autonomous vehicles for illustrative purpose, such maps may be useful for creating simulated environments in games, generating scale models of cities, and the like.

This disclosure is generally directed to a system configured to receive (e.g., at a first time) a first sensor dataset representing an environment, and segment the first sensor dataset according to a plurality of classifications. The system may also be configured to associate the sensor dataset with a voxel space including a plurality of voxels, and update (e.g., increment or decrement) one or more counters associated with the voxels, based at least in part on the first sensor dataset. The system may also be configured to receive at one or more additional times one or more additional sensor datasets representing the environment. In some examples, one or more of the additional times may be within a second or less relative to one another. In some examples, one or more of the additional times may be within a minute or less, an hour or less, or a day or less from one another. In some examples, one or more of the additional times may be greater than a day relative to one another. The system may also be configured to segment the one or more additional sensor datasets according to the plurality of classifications, and associate the one or more additional sensor datasets with the voxel space. The system may also be configured to update (e.g., increment or decrement) the one or more counters, based at least in part on the one or more additional sensor datasets, and update a map including the voxel space based at least in part on the one or more counters meeting or exceeding a first threshold. In some examples, the first threshold may be predetermined and/or may be determined in real-time based on, for example, the amount of time between counter increments. In some examples, the first threshold may be 5 or greater. In some examples, the first threshold may be less than 5. In some examples, the map may be a virtual, two- or three-dimensional digital map. In some examples, the map be a pre-existing map, and in some examples, the map may be being created at least in part by the sensor data, and updating the map may be adding information to, or omitting information from, the map being created. Such a voxel representation may further be enhanced through the use of a voxel hash. Of course, a voxel representation is one of many possible representations of such a map, and other possible representations are contemplated. As other non-limiting examples, such a map may be represented as a mesh, a signed distance function, and the like.

In some examples, the sensor dataset may be received from one or more of a light detection and ranging (LIDAR) sensor, a radio detection and ranging (RADAR) sensor, one or more ultrasonic transducers (e.g., sound navigation and ranging (SONAR) sensors)), or one or more imagers (e.g. cameras, depth cameras, stereo cameras, infrared cameras, time of flight cameras, ultraviolet cameras, etc.), etc. For example, the sensor dataset may be received from one or more LIDAR sensors, such as, for example, a LIDAR system for use in conjunction with a perception system of an autonomous vehicle. A LIDAR system may include a light emitter and a light sensor, with the light emitter including one or more lasers that direct highly focused light toward an object or surface, which reflects the light back to the light sensor. Measurements of the LIDAR system may be represented as three-dimensional LIDAR data having coordinates (e.g., Cartesian, polar, etc.) corresponding to positions and/or distances captured by the LIDAR system. Data captured by the LIDAR system may be represented in a voxel space, which may include representing the data in a grid of voxels in three-dimensional space.

In some instances, LIDAR data may be represented in a voxel space as raw sensor data (e.g., with individual <x, y, z, range, time, etc.> values associated with data points), and/or may be represented as a statistical accumulation of data. For example, LIDAR data may be accumulated in the voxel space, with an individual voxel including processed data, such as a number of data points observed, an average intensity of returns, an average x-value of the LIDAR data associated with the individual voxel, an average-y value of the LIDAR data associated with the individual voxel; an average z-value of the LIDAR data associated with the individual voxel; and/or a covariance matrix based on the LIDAR data associated with the voxel.

In some examples, the system may be configured to raycast the one or more additional datasets into the voxels as one or more rays, and determine one or more pass-through voxels though which the one or more rays pass. In some examples, the system may be configured to decrement the one or more counters associated with the pass-through voxels, and determine the one or more counters associated with the pass-through voxels meet a second threshold (e.g., a threshold lower than the first threshold, such that the one or more counters have decremented down to the second threshold). In some examples, the second threshold may be equal to zero. In some examples, the second threshold may be greater than zero (e.g., 1, 2, 3, 4, or more). The second threshold may be predetermined and/or may be determined in real-time based on, for example, the amount of time between counter decrements. In some examples, the system may also be configured to associate the one or more pass-through voxels as non-occupied voxels.

The plurality of classifications, in some examples of the system, may include one or more of a vehicle, a pedestrian, or a cyclist, and the system may be configured to remove from the first sensor dataset and the one or more additional sensor datasets data associated with a subset of the plurality of classifications. In some examples, segmenting the first sensor dataset and the one or more additional sensor datasets may include passing the one or more sensor datasets as input into a neural network, and receiving, from the neural network, segmented sensor data.

The system, in some examples, may be configured to segment a second sensor dataset of the one or more additional datasets. The system may also be configured to determine a first object in the second sensor dataset, and determine, based at least in part on the segmented second sensor dataset, the first object is a static object and is associated with a first classification. In some such examples, the system may also determine a first weight associated with the first object, and determine a second object in the segmented second sensor dataset. The system may be configured to determine, based at least in part on the segmented second sensor dataset, the second object is a dynamic object or a potentially dynamic object and is associated with a second classification. The system in such examples may be configured to determine a second weight associated with the second object, with the second weight being lower than the first weight. For example, if a sensed object type is consistent with a potentially dynamic object, such as a parked vehicle or vegetation, which might move, be moved, and/or change configuration or appearance in the future, the system may be configured to reduce the effect of the object during calculations involving the map (e.g., determining a vehicle pose and/or navigating the vehicle), for example, relative to object types that are consistent with static objects, such as, for example, road surfaces, retaining walls, buildings, utility poles, etc. By associating such data with lower weights, various processes (e.g., localization) may still be able to use such data while assigning a higher uncertainty to it and/or relying more heavily on such data associated with higher weights.

The system in some examples may also be configured to associate semantic information with the map. For example, the system may be configured to associate semantic information based at least in part on the segmented sensor datasets with the map. Adding semantic information to a map may facilitate one or more of removing semantically labeled voxels from the map based at least in part on the label (e.g., voxels labeled "vehicle," "pedestrian," etc.), identifying vegetation, establishing confidence levels (e.g., soft confidence levels and hard thresholds (e.g., do not use voxels labeled as "vehicle")), for use by a localizer of an autonomous vehicle. In some examples, the remaining segmented data (e.g., the sensor data remaining after removing data associated with certain semantic classes) may be used for localization.

In some examples, the system may also be configured to receive a third sensor dataset of the one or more additional sensor datasets at a third time, and segment the third sensor dataset according to the plurality of classifications. The system may further be configured to create a subset of data by removing, from the third sensor dataset, data associated with a subset of the classifications, and localize an autonomous vehicle based at least in part on the map and the subset of sensor data. In some such examples, removing certain data associated with certain classifications may improve various processes, such as localization.

This disclosure is also generally directed to a method including receiving (e.g., at a first time) a first sensor dataset representing an environment from one or more sensors, and segmenting the first sensor dataset according to a plurality of classifications. The method may also include associating the first sensor dataset with a voxel space including a plurality of voxels, and updating an occupancy state associated with the voxels (e.g., updating (e.g., incrementing and/or decrementing) one or more counters associated with the voxels)

based at least in part on the first sensor dataset, for example, as described herein. The method may also include receiving (e.g., at one or more subsequent times) one or more additional sensor datasets representing the environment, and segmenting the one or more additional sensor datasets according to the plurality of classifications. The method may also include associating the one or more additional sensor datasets with the voxel space, and updating an occupancy state associated with the voxels (e.g., incrementing and/or decrementing the one or more counters), based at least in part on the one or more additional sensor datasets. The method, in some examples, may further include updating a map including the voxel space based at least in part on the occupancy state associated with the voxels (e.g., based on the one or more counters being meeting or exceeding a threshold), for example, as described herein. In some examples, the method may also include determining one or more of a position or an orientation of a vehicle based at least in part on the map, and generating, based on the one or more of the position or the orientation of the vehicle, one or more trajectories for maneuvering the vehicle. In such examples, the method may also include maneuvering the vehicle based at least in part on the one or more trajectories.

The techniques described herein may improve the functioning of a computing device by providing a framework for efficiently omitting undesired or extraneous data from maps. In some examples, complex multi-dimensional data, such as LIDAR data and/or data from other sensor types, may be represented in a voxel space allowing for efficient evaluation and processing of the data. In some examples, the voxel space may represent a sparse voxel space, which may reduce the amount of data for processing. In some examples, the techniques may provide robust processes to omit extraneous data and/or segment data, which may, in some examples, be used for trajectory generation. The reduction of extraneous data may reduce the amount of processing and/or memory required for operations using the map. In some examples, operations described herein may be used in an online and offline context (e.g., on a vehicle for real-time processing, or off a vehicle for processing at any time), thereby providing a flexible framework to utilize the maps in a variety of contexts. In some examples, maps without extraneous data may be used in generating a trajectory of an autonomous vehicle, which may improve safety for occupants of the autonomous vehicle. The operations, in some examples described herein may reduce memory requirements or reduce an amount of processing by operating on voxelized data to efficiently simplify the data. These and other potential improvements to the functioning of the computer are discussed herein.

The techniques and systems described herein may be implemented in a number of ways. Example implementations are provided below with reference to the figures.

FIG. 1 is a pictorial flow diagram of an example process 100 for representing a sensor dataset in a map, such as a voxel space, and identifying objects for subsequent processing, such as, for example, for updating the map. In the example shown, an example vehicle 102 travels through the environment 104. For example, the vehicle 102 may be may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more internal combustion engines, one or more electric motors, hydrogen power, any combination thereof, and/or any other suitable power sources. Although the example vehicle 102 has four wheels 106, the systems and methods described herein may be incorporated into vehicles having fewer or a greater number of wheels, tires, and/or tracks. The example vehicle 102 may have four-wheel steering and may operate generally with substantially equal performance characteristics in all directions, for example, such that a first end 108 of the vehicle 102 is the front end of the vehicle 102 when traveling in a first direction 110, and such that the first end 108 becomes the rear end of the vehicle 102 when traveling in the opposite, second direction 112, as shown in FIG. 1. Similarly, a second end 114 of the vehicle 102 is the front end of the vehicle 102 when traveling in the second direction 112, and such that the second end 114 becomes the rear end of the vehicle 102 when traveling in the opposite, first direction 110. These example characteristics may facilitate greater maneuverability, for example, in small spaces or crowded environments, such as parking lots and urban areas.

A vehicle, such as the example vehicle 102, may travel through the environment 104 and collect data for mapping (e.g., creating a map and/or revising an existing map). For example, the vehicle 102 may include one or more sensors 116 configured to capture datasets representative of the environment 104 as the vehicle 102 travels through the environment 104. In the example shown in FIG. 1, the sensor(s) 116 and associated description are described in relation to use of one or more LIDAR sensors. Although discussed in the context of LIDAR sensors and/or in the context of an autonomous vehicle, the methods, apparatuses, and systems described herein may be applied to a variety of systems utilizing, for example, any other sensor modalities and its associated detection, classification, segmentation, and mapping algorithms, such as computer vision algorithms used on image sensors. In addition, although described in relation to three-dimensional LIDAR data, the methods, apparatuses, and systems described herein are not limited to three-dimensional data, and are not limited to LIDAR data. For example, the one or more sensors may be one or more RADAR sensors, one or more ultrasonic transducers, one or more imagers (e.g., stereoscopic cameras, depth cameras, etc.), and/or any sensor types configured to generate sensor datasets representative of the environment. In some examples, the methods, apparatuses, and systems may be used for other purposes, for example, in a manufacturing assembly line context, or in an aerial surveying context. The datasets may include any number of layers or channels, which may correspond to any number of dimensions. In some examples, the techniques described herein may be used with actual data (e.g., captured using sensor(s)), simulated data (e.g., generated by a simulator), and/or combinations thereof.

As shown in FIG. 1, the vehicle 102 travels through the environment 104, and the one or more sensors 116 generates datasets representative of the environment 104. For example, the one more sensors 116 may substantially continuously or intermittently generate sensor datasets including sensor data corresponding to one or more objects 118 in the environment 104. The example process 100, at 120, may include generating via the one or more sensors 116 a sensor dataset at a first at time $T_1$ 122 representative of one or more objects 118 in the environment 104, which may include LIDAR data (e.g., a point cloud) associated with various objects in an urban environment, such as cars, trucks, roads, buildings, bicycles, pedestrians, etc. In some examples, this may include receiving a plurality of datasets from the one or more sensors 116, which may be operating in association with a perception system of the vehicle 102, for example, when the vehicle 102 is an autonomous vehicle. In some examples, the data from the datasets may include combined or fused data from datasets obtained from two or more sensors into a single sensors dataset. In some examples, sensor datasets may be generated and/or processed at subsequent times. For example, as shown in FIG. 1, the process 100 may include generating sensor datasets at time $T_2$ 124 through a sensor dataset at time TN 126, and the process 100 may include extracting at least a portion of the sensor datasets, for example, over a period of time. In some examples, at 120, the process 100 may include receiving datasets from more than a single sensor and/or from more than a single sensor type and associating the sensor datasets to obtain a more detailed representation of the environment 104.

At 128, the process 100 may include segmenting a first sensor dataset associated with the first time $T_1$ 122 according to a plurality of classifications. In some examples, segmenting the first sensor dataset may include communicating the first sensor dataset as input into a neural network, which may segment data, though any other segmentation algorithm is contemplated. Based at least in part on the segmented first sensor dataset, the classifications may include, for example, one or more of a vehicle, a pedestrian, or a cyclist. Other classifications are contemplated.

At 130, the process 100 may in some examples include associating the first sensor dataset at time $T_1$ 122 with a voxel space 132. For illustrative purposes, the example voxel space 132 depicted in FIG. 1 includes five voxels 134 in each dimension (e.g., x, y, z), although any number of voxels 134 may be included in the voxel space 132 (e.g., on the order of ten, hundreds, or thousands of voxels in any dimension). In some instances, the voxel space 132 may correspond to a physical environment 104, such as an area around a global origin, a local origin, or a virtual origin of the sensor dataset. For example, the voxel space 132 may represent an area one-hundred meters wide, one-hundred meters long, and twenty meters high, although any other dimension is contemplated. Each voxel 134 in the voxel space 132 may represent a physical region or volume, such as, for example, twenty-five centimeters in each dimension, although other dimensions are contemplated. The voxel space 132 may represent any region of the environment 104, and the individual voxels 134 may represent any volume. In some examples, voxels may have a substantially uniform size (e.g., volume) throughout the voxel space 132, and in some examples, the volume of a given one of the voxels 134 may vary based on, for example, a location of the voxel relative to an origin of the sensor dataset. For example, the density of the sensor dataset may decrease as a distance from one of the sensors 116 increases, and the size of a voxel in a voxel space may increase in proportion to the distance between the voxel and the sensor, or, for example, an origin representing one or more of the sensors 116.

In some examples, as data is captured over time, associating the sensor dataset with the voxel space 132 may include aligning the sensor datasets (e.g., a LIDAR sensor dataset) with the voxel space 132. For example, associating the sensor dataset with the voxel space 132 may include determining a transformation to apply to the sensor dataset to align the sensor dataset with the voxel space 132. For example, if the sensor 116 is a LIDAR sensor, associating the sensor dataset with the voxel space 132 may include matching captured LIDAR data with data captured in the voxel space 132 by determining the distance from observed points to the existing captured data or existing map, or otherwise performing localization.

In some examples, the voxel space 132 may be initialized as empty space, and sensor datasets may be added to the voxel space 132 as they are captured, for example, as modified as described herein. In some examples, the voxel space 132 may be initialized with data representing a global map of previously captured data. In examples using global map data, the operations may include comparing the locally captured sensor dataset against the global data to localize the vehicle 102 (e.g., an autonomous vehicle) in the global map space. In some examples, such a voxel space may be referenced using a voxel hash.

In some examples, associating the first sensor dataset with the voxel space 132 may include mapping individual points of a point cloud to individual voxels, for example, when the sensor dataset is received from a LIDAR sensor. In some examples, this may include subtracting a motion vector associated with the sensor dataset, for example, when the sensor dataset is captured by a moving platform, such as an autonomous vehicle, and subtracting a motion vector associated with the first sensor dataset may be used to convert the sensor dataset to a stationary reference point. In particular, in some instances, the sensor dataset may be associated with a voxel space that is fixed with respect to a global map, in contrast to, for example, a voxel space fixed with respect to a moving vehicle. In some examples, associating the first sensor dataset with the voxel space 132 may include aligning a pose of the vehicle 102 (e.g., a position and/or an orientation of the vehicle 102) and first sensor dataset with a voxel map, for example, to compensate or adjust for errors associated with the position of the vehicle 102 with respect to the voxel space 132.

In some examples, associating the sensor dataset with the voxel space 132 may include statistically capturing sensor data and processing the sensor data as it is added to individual voxels. For example, individual voxels may include data representing a number of data points observed from the sensor(s), an average intensity (e.g., of the LIDAR sensor data), an average x-value of the data, an average y-value of the data, an average z-value of the data, and/or a covariance matrix based on the sensor data associated with the individual voxel. Thus, in some examples, data associated with individual voxels may represent processed data, which may improve the processing performance of the system.

After associating the sensor dataset with the voxel space 132, the process 100, at 136, may include updating (e.g., incrementing) one or more counters associated with the voxels 134, based at least in part on the first sensor dataset. For example, the counter may increment only those voxels 134 associated with the data and/or decrement those voxels 134 between a sensor origin and the associated data (e.g. a range and angle). In some examples, the counter may decrement only those voxels 134 associated with the data and/or increment those voxels 134 between a sensor origin and the associated data (e.g. a range and angle).

At 138, the process 100 may include receiving at one or more additional times (e.g., at subsequent times) one or more additional sensor datasets representing the environment 104. For example, one or more the sensor datasets at time $T_2$ 124 through TN 126 may be received. Thereafter, at 140, some examples of the process 100 may include segmenting the one or more additional sensor datasets according to the plurality of classifications, and at 142, associating the one or more additional sensor datasets not associated with one or more of the classifications (i.e., only associating those datasets of a subset of the classifications) with the voxel space 134. For example, based at least in part on the segmented additional sensor datasets, the classifications may include, for example, one or more of a vehicle, a pedestrian, or a cyclist. In such an example, data associated with vehicles, pedestrians, and/or cyclists may be discarded from the dataset so as not to be associated with the voxels 134. Other classifications are contemplated. At 144, the process may also include updating (e.g., incrementing) the one or more counters, based at least in part on the one or more additional sensor datasets, and at 146, updating a map including the voxel space based at least in part on the one or more counters meeting or exceeding a first threshold indicating that such voxels 134 are "occupied." As noted above, this may result in omitting (e.g., automatically omitting) dynamic objects from a map while the map is being created, or in some examples, omitting (e.g., automatically omitting) dynamic objects from an existing map. Thus, in some examples, this may be used to clean (e.g., automatically clean) a map during its creation and/or clean (e.g., automatically clean) an existing map by only incorporating static objects, or by removing dynamic objects where applicable. In some examples, "cleaning" may alternatively, or additionally, refer to omitting (or removing) artifacts from the map that may correspond to dynamic trails associated with dynamic objects that were added to the map based on sensor data associated with the dynamic objects. In some examples, this omission or removal may be automatically performed during creation of the map or after the map has been created (e.g., when updating a map).

In certain scenarios, it is difficult or impossible to determine that once-occupied voxels are no longer occupied. For example, when acquiring sensor data associated with an object (e.g., a vehicle) following the autonomous vehicle, it may be difficult or impossible to determine that the voxels that were once occupied by the object are no longer occupied, because, for example, regions behind the object may not be visible to sensors of the autonomous vehicle. This effect may create dynamic trails in the map where the object does not actually exist. These dynamic trails (or artifacts) may result in undesirable effects. For example, dynamic trails may hinder localization (e.g., by a vehicle such as an autonomous vehicle) due, for example, to extraneous data in the map associated with objects that are no longer present where indicated in the map. This may result in difficulty subtracting background data associated with the map from sensor data obtained from sensors coupled to a vehicle as it travels through the environment. Background subtraction may be used to assist the vehicle with identifying objects in the environment that are not part of the background (e.g., the background including static structures, such as the road surface, buildings, barriers, traffic signals, curbing, etc.). In addition, maps that include dynamic trails may be undesirable for use in simulations for similar reasons.

In some examples, sensor datasets obtained from the one or more sensors 116 may be accumulated over time, such as the example sensor dataset at time $T_1$ 122 and the sensor datasets generated at additional times (e.g., subsequent times), such as the sensor dataset at time $T_2$ 124 through the sensor dataset at time TN 126. For example, as sensor datasets are accumulated over time, the process 100 may include determining whether a voxel is occupied by an object at first time based at least in part on the sensor dataset at time $T_1$ 122, and thereafter, determine whether the voxel is occupied at additional times such as at a second time $T_2$ through a time TN.

In some examples, the process 100 may include tracking the occupancy of a voxel over time to determine whether the voxel is truly occupied. For example, the process 100 may include determining whether the counted instances of measurements associated with the voxel meets or exceeds a threshold number of instances, which may indicate that the voxel is occupied. A change in occupancy of the voxel may indicate that an associated object is a dynamic object. For example, if the object is determined to be present at a first time but not at later subsequent times, it may be an indication that the object is a dynamic object, since its presence in the voxel ceased, indicating that the object moved to a position that does not include the location corresponding to the location of the voxel. If, however, the object is detected as being present in sensor datasets corresponding to a threshold number of subsequent times, it may be an indication that the object is static. In some examples, the counted instances may be consecutive instances. In some examples, one or more of the subsequent times may be within a second or less relative to one another, within a minute or less, an hour or less, or a day or less from one another. In some instances, one or more of the subsequent times may be greater than a day relative to one another. The threshold number of instances may be predetermined and/or may be determined in real-time or dynamically based on, for example, one or more characteristics associated with the sensed object, and/or the amount of time between instances.

In some examples, the process 100 may also include updating, based at least in part on the comparison, a map including the voxel space to identify occupancy of the one or more voxels by an object. For example, if the number of instances is greater than a threshold number of instances (e.g., five or more), the voxel may be determined to be occupied. Alternatively, if the number of counted instances is less than the threshold number of instances, the process 100 may include indicating that the region of the environment associated with the voxel is not occupied. In some examples, this may include not adding the object associated with the voxel to a map being created (or updated), or removing the object (e.g., clearing the voxels) from an existing map. In some examples, not adding the object to the map during map creation may be automatic and may prevent the likelihood of adding dynamic trails to the map. In some examples, objects that are determined to be dynamic objects may not necessarily be omitted. Rather, in some examples, the process 100 may include labelling data associated with the dynamic object with a "dynamic" flag, so that the data may be selectively loaded accordingly (e.g., the object may be selectively present in the map based on a selection of whether to include dynamic objects). In some examples, removing the voxel from the map (and/or deciding not to associate it with an indication of being occupied) may result in eliminating dynamic trails from the map. In some examples, the map may be a global map stored in a database (e.g., a central database) that may be accessed by third parties and/or vehicles to localize devices and/or vehicles with respect to the global map.

Figure 4:
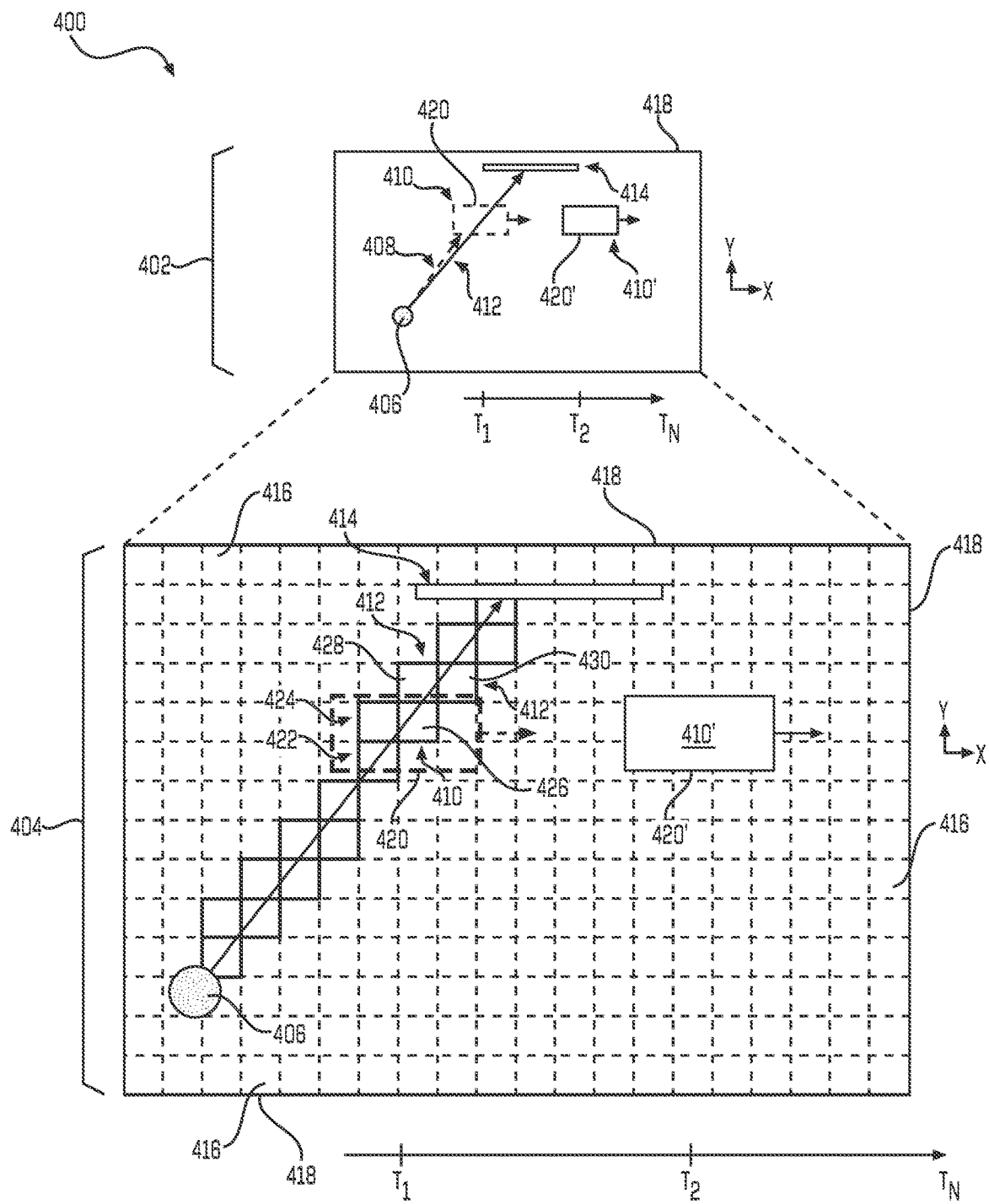
FIG. 4 is a schematic diagram of example ray casting and example dynamic object identification.

As explained in more detail with respect to FIG. 4, the process 100 may include ray casting operations to determine whether voxels occupied at a first time are not occupied at a second time. For example, the one or more sensors 116 may include a LIDAR sensor configured to capture LIDAR datasets, pictorially represented by a first vector, to identify and/or segment an object. Subsequently, at a second time, the LIDAR sensor may capture LIDAR datasets, pictorially represented as a second vector, to identify and segment a different, second object, which may correspond, for example, to a wall or building. In some examples, and as discussed with respect to FIG. 4, the process 100 may include determining voxels that the second vector passes through to determine that the voxels between the LIDAR sensor and the second object are not occupied.

Figure 2:
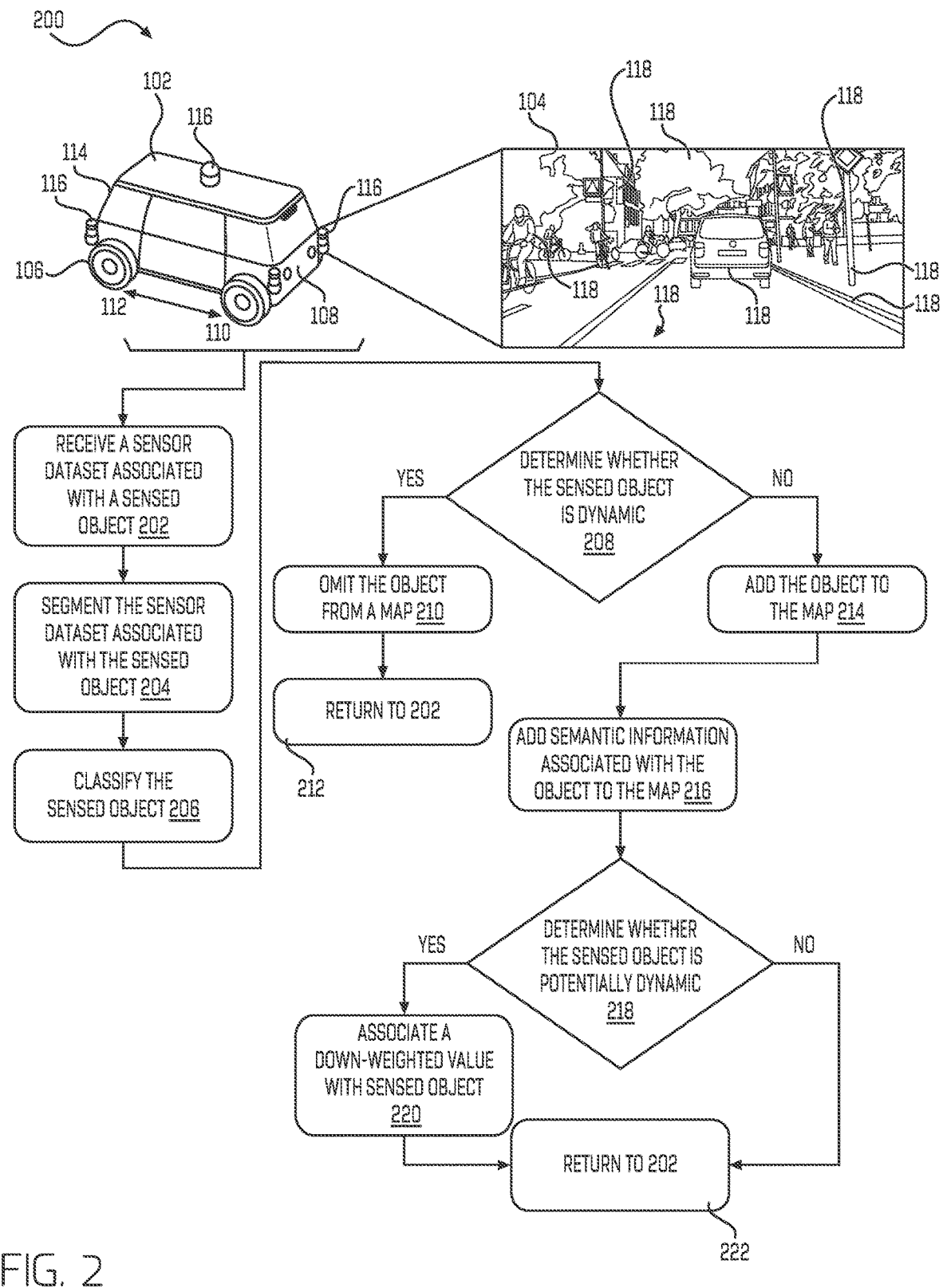
FIG. 2 is a pictorial flow diagram of another example process for updating and/or annotating a map.

FIG. 2 as a pictorial flow diagram of an example process 200 for updating a map based at least in part on a sensor dataset, for example, as described below. At 202, the process 200 may include receiving a sensor dataset associated with an object, such as, for example, one or more of the objects 118 detected in the environment 104. The sensor dataset may be obtained from one or more of one or more LIDAR sensors, one or more RADAR sensors, one or more SONAR sensors, one or more ultrasonic transducers, one or more imagers, and/or any sensor types configured to generate sensor datasets representative of objects in an environment.

In some examples, the process 200 may include at 204 segmenting at least a portion of sensor dataset associated with an object. For example, a sensor dataset associated with the sensed object may be communicated to a machine learning network, such as a segmentation network configured to run a sensor data segmentation model, which segments the sensor data associated with the object. In some examples, the segmentation network may be any type of network described herein. At 206, based at least in part on the segmented sensor data, the sensed object may be classified.

In some examples, following classification of the sensed object, at 208 the process 200 may include determining whether the sensed object is dynamic. For example, dynamic objects may include vehicles, cyclists, pedestrians, animals, etc. If the object is determined to be dynamic, at 210, the process 200 may include omitting the sensed object from the map, for example, as described herein. Thereafter, at 212, the process 200 may include returning to 202, for example, to repeat some or all of the previously described portions of the process 200. On the other hand, if the sensed object is not dynamic, at 214, the process 200 may include adding the object to the map, for example, as described herein.

In some examples, at 216, the process 200 may include adding (e.g., automatically adding) semantics associated with the sensed object to the map. In some examples, the semantics may be based, at least in part, on the segmented sensor data associated with the sensed object. For example, semantics may include labels associated with one or more objects in the environment, such as, for example, buildings, the road surface, sidewalks, barriers, vegetation (e.g., trees and bushes), etc. In some examples, sensor data characteristics, such as, for example, intensity, RGB, classification, etc. may be stored in the map.

In some examples, at 218, the process 200 may include determining whether the sensed object is potentially dynamic, for example, such as a tree or a bush, which may change in appearance (e.g., size, shape, color, density, etc.) and/or location over time. Because such objects may change in appearance and/or location, even though they may be helpful for determining location and/or orientation, and/or for use in navigation, their importance in such determinations may be relatively less reliable than determinations based on static objects, such as road surfaces, buildings, etc.

In some examples, at 220, if the sensed object is determined to be potentially dynamic, the process 200 may associate a down-weighted value with the sensed object, for example, with respect to its effect when used by a vehicle perception system to determine its pose and/or to navigate the vehicle. For example, when the vehicle 102 is traversing through the environment 104 at a later time and tries to localize within the environment 104, the vehicle 102 does not rely as heavily on objects associated with a down-weighted value for localization. For example, if an object is a static object, a weight may be associated with the object based at least in part on its identification as a static object. If, however, an object is determined to be a dynamic object or a potentially dynamic object, a different, reduced weight (e.g., a "down-weighted" weight) relative to the weight associated with a static object may be associated with the dynamic or potentially dynamic object. Based at least in part on the down-weighted weight, when localizing, the vehicle 102 may rely less heavily on the dynamic or potentially dynamic object as compared to the static object. This example strategy may increase the accuracy and/or speed of the localization process.

Thereafter, at 222, the process 200 may return to 202, so that at least portions of the process 200 may be repeated. If at 220, it is determined that the sensed object is not potentially dynamic (e.g., it is static), at 222, the process 200 may return to 202, and at least portions of the process 200 may be repeated, for example, without down-weighting the sensed object.

In some examples, at least portions of the example process 100 shown in FIG. 1 and at least portions of the example process 200 shown in FIG. 2 may be combined. For example, a sensor dataset may be received and a voxel space may be created. Thereafter, based at least in part on the sensor dataset, in some examples, a ground plane may be determined, and free space and objects in the voxel space may be identified, for example, as described above with respect to the example process 100 described with respect to FIG. 1. Based at least in part on these determinations, dynamic objects identified in the voxel space may be omitted from a map (e.g., dynamic objects may not be added to a map being created, and/or dynamic objects may be removed from an existing map). In addition, in some examples, at least portions of sensor dataset may be segmented, for example, by a machine learning network including a sensor data segmentation network using a sensor data segmentation model configured to segment the sensor data. The segmented sensor data associated with detected objects may be used to classify the objects, for example, as either being dynamic or static, and dynamic objects may be omitted from the map. This may permit omission from the map of objects such as parked vehicles, which may be difficult to remove from the map using only the example process 100 describe with respect to FIG. 1. In some examples, based at least in part of the segmented sensor data associated with the objects, semantics associated with the objects may be added to the map, for example, as described above with respect to example process 200 with respect to FIG. 2.

Figure 3:
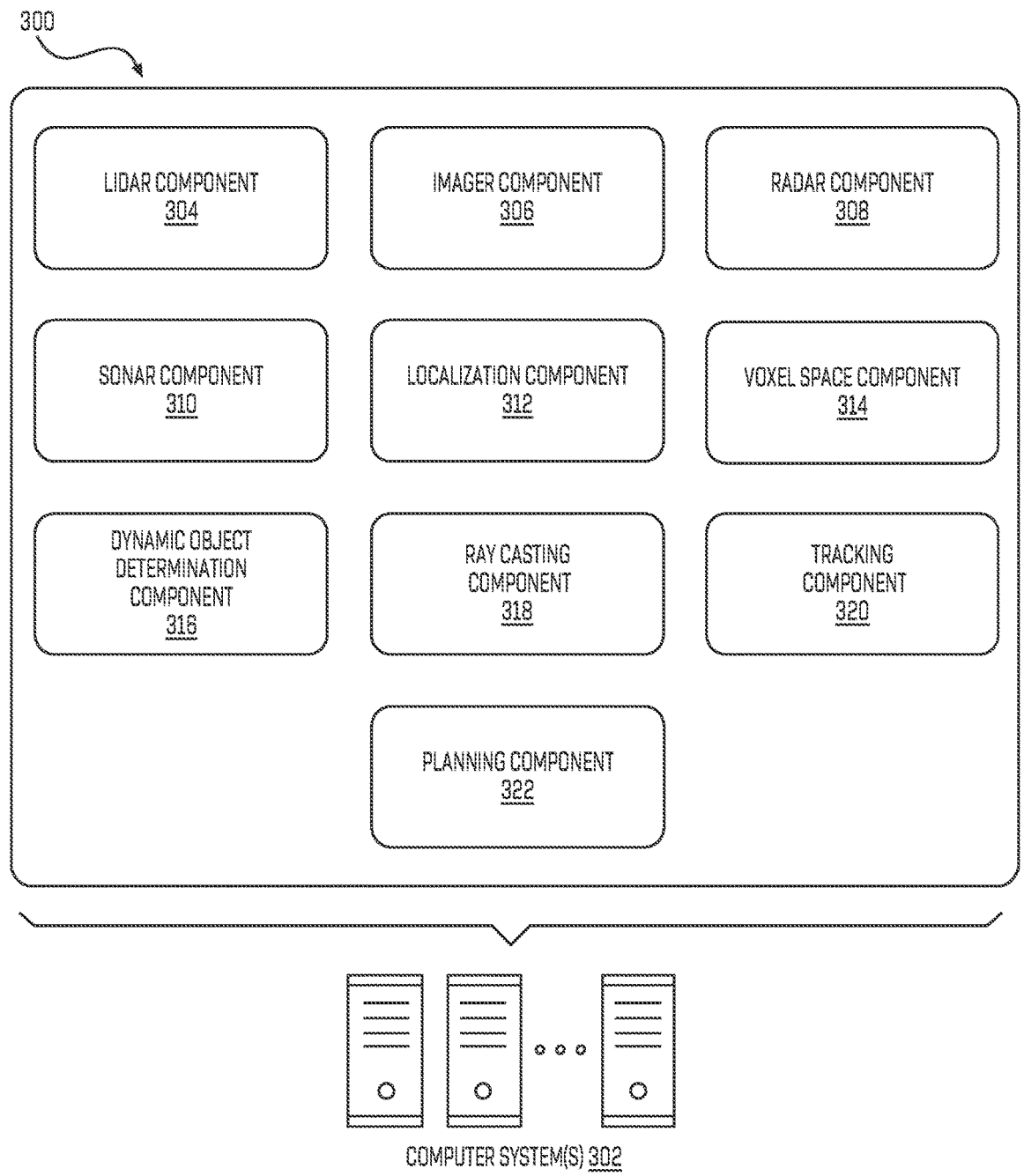
FIG. 3 is shows an example architecture for implementing one or more of the example processes described herein.

FIG. 3 shows an example architecture 300 for implementing the processes described herein. The architecture 300 may include one or more computer system(s) 302 including various hardware and/or software to implement aspects of the systems, methods, and apparatuses described herein. For example, the computer system(s) 302 may include a LIDAR component 304, an imager component 306, a RADAR component 308, a SONAR component 310, a localization component 312, a voxel space component 314, a dynamic object determination component 316, a ray casting component 318, a tracking component 320, and a planning component 322.

In some examples, the computer system(s) 302 may be embodied in an autonomous vehicle. In some examples, the computer system(s) 302 may provide perception and planning functionality for the autonomous vehicle. In general, the computer system(s) 302 may include LIDAR perception, RADAR perception, Vision (imager) perception, acoustic perception, segmentation and classification, tracking and fusion, and prediction/planning.

The LIDAR component 304 may include one or more LIDAR sensors configured to capture LIDAR data, as described herein. The LIDAR component 304 may include one or more depth sensors. In some examples, the LIDAR component 304 may be configured to combine or synthesize LIDAR data from a plurality of LIDAR sensors to generate a meta spin of LIDAR data, which may refer to LIDAR data obtained from multiple LIDAR sensors. In some examples, the LIDAR component 304 may be configured to determine a virtual origin of the meta spin data (e.g., a coordinate reference frame common to all the LIDAR sensors) and perform a data transformation, such that LIDAR data from each of the one or more LIDAR sensors is expressed with respect to the virtual origin. For example, the LIDAR component 304 may be configured to capture data and may communicate datasets to the computer system(s) 302 for processing.

The imager component 306 may include one or more imagers configured to capture vision data for image segmentation and/or classification, for example, as described herein. The imager component 306 may include any number and type of image sensors. For example, the imager component 306 may include any color cameras, monochrome cameras, depth cameras, RGB-D cameras, stereo cameras, infrared (IR) cameras, ultraviolet (UV) cameras, etc. In some examples, the imager component 306 may be configured to capture data and may communicate datasets to the computer system(s) 302 for processing. For example, data from the imager component 306 may be included as one or more channels of a multi-channel image.

The RADAR component 308 may include one or more RADAR sensors configured to capture the range, angle, and/or velocity of objects in an environment. In some examples, the RADAR component 308 may be configured to capture data and may communicate datasets to the computer system(s) 302 for processing. For example, data from the RADAR component 308 may be included as one or more channels of a multi-channel image.

The SONAR component 310 may include one or more speakers or sound emitters and one or more microphones (e.g., such as a microphone array) configured to capture acoustic information associated with objects in the environment. In some examples, the SONAR component 310 may include various ultrasonic transducers. For example, the SONAR component 310 may be configured to emit pulses of sound and may listen for echoes to determine a position and/or motion information associated with objects in the environment. In some examples, the SONAR component 310 may be configured to capture data and may communicate datasets to the computer system(s) 302 for processing. For example, data from the SONAR component 310 may be fused with data from the LIDAR component 304 in order to more accurately segment objects and/or to determine information about the objects.

The computing system(s) 302 may include any number or type of other sensors suitable for use in an autonomous vehicle, for example. Various sensors may include, but are not limited to, ultrasonic transducers, wheel encoders, microphones, inertial measurement unit(s) (IMU), accelerometers, gyroscopes, magnetometers, temperature sensors, humidity sensors, light sensors, global positioning system (GPS) sensors, etc.

In some examples, the LIDAR component 304, the imager component 306, the RADAR component 308, and/or the SONAR component 310 may provide one or more datasets to the computer system(s) 302 for combining and/or synthesizing the data for improved segmentation.

The computer system(s) 302 may also include simulated data that has been generated by a computer simulation algorithm for use, for example, in testing. In some examples, simulated data may include any type of simulated data, such as, for example, imager data, LIDAR data, RADAR data, SONAR data, inertial data, GPS data, etc. In some examples, the computer system(s) 302 may be configured to modify, transform, and/or perform converting operations described herein on the simulated data, for example, for verifying an operation and/or for training machine learning algorithms, as described herein.

In some examples, the localization component 312 may be configured to receive data from one or more of the sensors 116 and determine a position of the vehicle 102. For example, the localization component 312 may include a three-dimensional map of an environment and may continuously or intermittently determine a location of the autonomous vehicle within the map. In some examples, the localization component 312 may use SLAM (simultaneous localization and mapping) or CLAMS (calibration, localization and mapping, simultaneously) to receive image data, LIDAR data, RADAR data, SONAR data, IMU data, GPS data, and the like to accurately determine a location of the autonomous vehicle. In some examples, the localization component 312 may provide data to various components of the vehicle 102 to determine an initial position of an autonomous vehicle for generating candidate trajectories, for example, as described herein.

The voxel space component 314 may be configured to convert or map data to a voxel space. For example, the voxel space component 314 may be configured to receive sensor datasets, such as LIDAR data, imager data, RADAR data, SONAR data, etc., and map, convert, and/or associate data points to a voxel space representing a three-dimensional space in an environment. In some examples, the voxel space component 314 may be configured to define dimensions of a voxel space, including a length, width, and height of the voxel space. The voxel space component 314, in some examples, may be configured to determine a size of individual voxels. In some examples, voxels may be a uniform size and shape throughout the voxel space, and in some examples, the size and/or density of voxels may vary based on, for example, a relative location in the voxel space. For example, the size of a voxel may increase or decrease in proportion to the distance between the voxel and an origin or center of the voxel space. In some examples, the voxel space component 314 may perform a transformation between a virtual origin and an origin of the voxel space. In some examples, the voxel space component 314 may be configured to generate a sparse voxel space, which may include discarding voxels that do not include data, or that include an amount of data below a data minimum level. In some such examples, the voxel space component 314 may include an octomap, voxel hashing, or the like. In some examples, the voxel space component 314 may be configured to reduce an amount of noise in the data by, for example, filtering data as it is mapped to the voxel space. For example, filtering may include removing data below a minimum amount of data per voxel (e.g., a number of LIDAR data points associated with a voxel) or over a predetermined number of voxels (e.g., a number of LIDAR data points associated with a number of proximate voxels). In some examples, the voxel space component 314 may be configured to update a voxel space as data is gathered over time, and/or in response to an autonomous vehicle maneuvering within the voxel space. For example, the voxel space component 314 may add data and/or discard data from the voxel space as an autonomous vehicle maneuvers in the environment.

In some examples, the voxel space component 314 may be configured to initialize the voxel space as empty space and build up representations of objects as sensor datasets (e.g., LIDAR data) are captured over time. In some examples, the voxel space component 314 may be configured to initialize the voxel space with global map data, for example, so that the locally captured sensor datasets (e.g., LIDAR data) may be used to localize the autonomous vehicle within the global map space, and may be used to clean (or clear) voxels of the global map, for example, as described herein. In some examples, the voxel representations may be transformed into a mesh representation, such as, for example, through the use of marching cubes, or the like.

The dynamic object determination component 316 may be configured to distinguish between static objects and dynamic objects. For example, the dynamic object determination component 316 may accumulate data over time to determine motion of objects by comparing voxels at a first time to the voxels at subsequent times to determine if an occupancy of the voxel has changed over time, for example, as described herein. For example, if a voxel was occupied by an object at a first time and is not occupied by the object at subsequent times, the dynamic object determination component 316 may be configured to determine that the object is a dynamic object. For example, the dynamic object determination component 316 may be configured to receive sensor datasets associated with a voxel space, identify the presence of an object within one or more voxels of the voxel space at a first time, count instances of the presence of the object at subsequent times, and based at least in part on instances of the presence of the object being greater than a threshold number of instances, determining that the object is a static object, for example, as described herein. Conversely, if the dynamic object determination component 316 determines that the instances of the presence of the object in the one or more voxels are less than the threshold, the dynamic object determination component 316 may instead determine that the object is a dynamic object, for example as described herein. In some examples, based at least in part on voxels that are either occupied or not occupied over time, the dynamic object determination component 316 may be configured to determine movement of the dynamic object, such as, for example, the velocity of movement, including the speed and/or direction.

The ray casting component 318 may be configured to collaborate with the dynamic object determination component 316, for example, to distinguish between static objects and dynamic objects. In some examples, the ray casting component 318 may be configured to clear the voxel space over time as data accumulates in the voxel space. For example, as an object moves within the voxel space over time, the voxels occupied by a dynamic object may capture data over time. In some examples, the ray casting component 318 may be configured to analyze the path of a ray associated with sensor datasets (e.g., LIDAR data), for example, to determine that voxels through which the ray travels should be cleared. In this example manner, the ray casting component 318 may be configured to determine that voxels occupied at a first time are not occupied at one or more subsequent times, which may be provided to the various components, for example, and to determine that objects are dynamic objects. In some examples, one or more counters may increment or decrement based on whether the voxels are associated with data, and thresholds may be used to mark the unoccupied voxels as "free space" and occupied voxels as "not free space," for example, as described with respect to FIG. 5. In some examples, the voxel space may be represented in a sparse manner (e.g., representing occupied voxels and disregarding unoccupied voxels) or in a dense manner (e.g., without discarding voxels). In some examples, the ray casting component 318 may be configured to store ray casting information in a dense manner, for example, such that voxels that do not exist in a sparse voxel representation (e.g., because voxels do not have associated sensor datasets) are associated with ray casting information for such voxels. For example, voxels without associated sensor datasets may nevertheless be represented in a dense voxel space to include associated ray casting information. In some such examples, the dense voxel representation may associate positive information with a voxel (e.g., that a voxel is unoccupied), at least in part in response to the ray casting operations discussed herein. In some examples, as sensor datasets are accumulated with respect to individual voxels, negative information may be associated with the individual voxels, for example, indicating they are occupied with a static object. As data is accumulated over time, the information may be aggregated, for example, in part, to determine whether a voxel represents open space or a static object. In some examples, the ray casting component 318 may be configured to facilitate cleaning a global map, for example, by comparing the locally captured sensor datasets against global map data, as described herein.

The tracking component 320 may be configured to receive notification of one or more dynamic objects and perform additional processing in order to track the dynamic objects. For example, the tracking component 320 may be configured to determine the velocity of a dynamic object, including its speed and/or trajectory, and/or store the trajectory of the dynamic object over time. In some examples, the tracking component 320 may include a prediction algorithm that may predict the path of the object being tracked based, for example, on previous motion of the object, a classification type of the object, a machine learning algorithm trained to identify particular behavior, and the like.

The planning component 322 may be configured to receive segmented data and/or indications of the ground plane, static objects, and/or dynamic objects, for example, to assist with determining a trajectory of an autonomous vehicle. For example, the planning component 322 may be configured to receive segmentation information identifying the ground plane and one or more objects, and may generate a trajectory for the autonomous vehicle to follow. As above, such a planning module may repeatedly generate a plurality of trajectories in accordance with a receding horizon technique and select one trajectory having a highest confidence level for the autonomous vehicle to traverse.

An artificial neural network (ANN) may be a biologically inspired algorithm, which passes input data through a series of connected layers to produce an output. One example of a neural network may include a convolutional neural network, or CNN. Each layer in a CNN may also include another CNN, or may include any number of layers. As may be understood in the context of this disclosure, a neural network may use machine learning, which may refer to a broad class of such algorithms, in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees)), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), support vector machine (SVM), supervised learning, unsupervised learning, semi-supervised learning, etc.

In some examples, more than one type of machine learning may be used to provide respective results for each of the types of machine learning used. In some examples, a confidence score may be associated with each of the results, and the result relied on may be based at least in part on the confidence score associated with the result. For example, the result associated with the highest confidence score may be selected over other results, or the results may be combined based on the confidence scores, for example, based on statistical methods, such as weighted averages, etc.

FIG. 4 shows an example ray casting process 400 as depicted by a first schematic view 402 and a second schematic view 404 providing a more detailed depiction of the first schematic view 402. As shown in FIG. 4, the ray casting process 400 may be used to determine whether voxels occupied by an object at a first time $T_1$ are no longer occupied at a subsequent, second time $T_2$. For example, a sensor 406 (e.g., a LIDAR sensor) may capture a sensor dataset represented by a first vector 408 to identify and/or segment a first object 410. At a second, subsequent time $T_2$, the sensor 406 may capture a sensor dataset represented as a second vector 412 to identify and/or segment a second object 414, which may correspond to, for example, a wall or building. In some examples, the ray casting process 400 may include determining voxels 416 of a voxel space 418 through which the second vector 412 passes to determine that the voxels 416 between the sensor 406 and the second object 414 are not occupied.

As shown in the exploded view of FIG. 4, the second vector 412 is shown originating from the sensor 406 and passing through a plurality of voxels 416 of the voxel space 418 to capture sensor datasets associated with the second object 414. The second vector 412 is associated with the second time $T_2$, by which time, in the example shown, the first object 410 has moved from a first position 420 at first time $T_1$ to a second position 420' at the second time $T_2$ associated with the object 410'. As schematically depicted, the second vector 412 passes through voxels 422, 424, 426, 428, and 430, which were previously occupied by data representing the first object 410 at time $T_1$. In some examples, the ray casting process 400 may also include determining some or all of the voxels through which the second vector 412 passes to determine that previously occupied voxels 422, 424, 426, 428, and 430 are no longer occupied at the second time $T_2$. In this example manner, the ray casting process 400 shown in FIG. 4 provides an example technique for use to determine that the first object 410 and 410' is a dynamic object, for example, as described herein.

In some examples, the ray casting process 400 may be configured to clear the voxels 422, 424, 426, 428, and 430 at, for example, a subsequent time, as described herein. In some such examples, the techniques described herein may be used to update a state of the voxel space over time to reduce an amount of data to be maintained at an instant in time, as well as to improve operations to detect and segment dynamic objects in a voxel space 418. This may facilitate a relative reduction in computer processing and/or memory use.

In some examples, the ray casting process 400 may be used to compare locally captured sensor datasets against previously captured global map data. For example, the first object 410 may correspond to an object represented in the global map data. If, however, the second vector 412 passes through the one or more voxels representing the object 410, when the second vector 412 represents locally captured sensor datasets, the example process 400 may be used to determine that there is a difference between the global map and the local map. In some examples, the difference may indicate that the global map is incorrect or that a state of the environment has changed (e.g., the physical world has changed by, for example, the removal of a tree or barrier). In this example manner, as differences between the global map and the locally-obtained sensor datasets are determined, the differences may be communicated to, for example, a central server to be incorporated into the global map data (e.g., if the differences are verified by consensus (e.g., by repeated observations of the same or similar event or data)) or if a confidence level associated with the sensor datasets is above a minimum amount). The updated global map may be distributed to other users, such as third parties and/or other vehicles.

Figure 5:
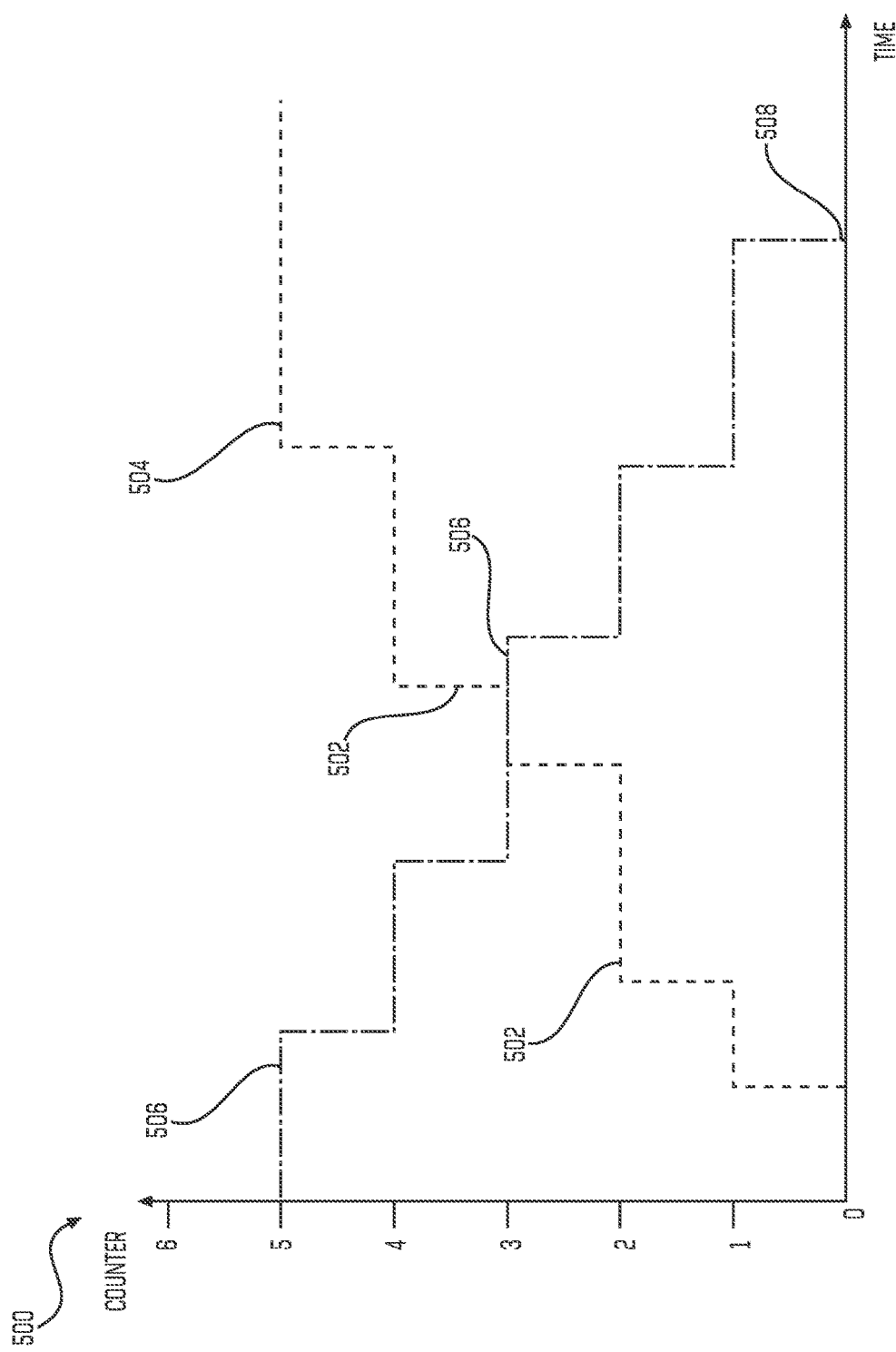
FIG. 5 is a graph showing an example of incrementing of a counter to determine free space and an example of decrementing of a counter to determine occupied space.

FIG. 5 is a graph showing an example of incrementing of a counter to determine "free space" and an example of decrementing of a counter to determine "not free space." As shown in FIG. 5, a counter may be compared to a threshold to determine whether a voxel of the voxel space should be marked as "free space," which is consistent with no object present at the location associated with the voxel, or marked as "not free space," which is consistent with the voxel being occupied, for example, by an object. Although FIG. 5 describes an example implementation for determining "free space" or "not free space" using an example counter incrementing and/or decrementing strategy, other strategies are contemplated. A "free space" or "not free space" determination may be made, for example, by observing aggregated data over time for the observed voxels, which may incorporate various algorithms or machine learned models. Incrementing or decrementing a counter associated with voxels is merely one example mechanism to accomplish the "free space" or "not free space" determination.

In the example shown in FIG. 5, the graph 500 includes a first line 502 associated with an example of incrementing a counter to mark a voxel as a "not-free space" associated with the voxel. As graphically shown, the counter associated with the voxel increments each time a presence of an object is detected as time passes until the counter meets a first threshold at 504, in this example five at which point the voxel is marked as "not-free space." Other threshold values are contemplated, such as those mentioned previously herein. In some examples, the counter may continue to increment over time as appropriate. In some examples, once the counter meets the first threshold, it may cease to increment. The example graph 500 also includes a second line 506 associated with an example of decrementing a counter to mark a voxel as "free space." As graphically shown, the counter associated with the voxel decrements each time a presence of an object is not detected as time passes until the counter meets a second threshold at 508, in this example zero. In some examples, once the counter meets the second threshold, it may cease to decrement. In this example manner, hysteresis may be used to mark voxels as either "free space" or "not free space." Such a process, as demonstrated in FIG. 5, may also be accomplished by reversing the increment and decrement such that the counter is decremented when data is associated with a voxel and incremented when raycasting passes through the voxel.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architecture 300 (see FIG. 3) is merely illustrative and is not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architecture 300 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture 300. Some or all the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 300 may be transmitted to the architecture 300 via transmission media or signals, such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations.

Figure 6:
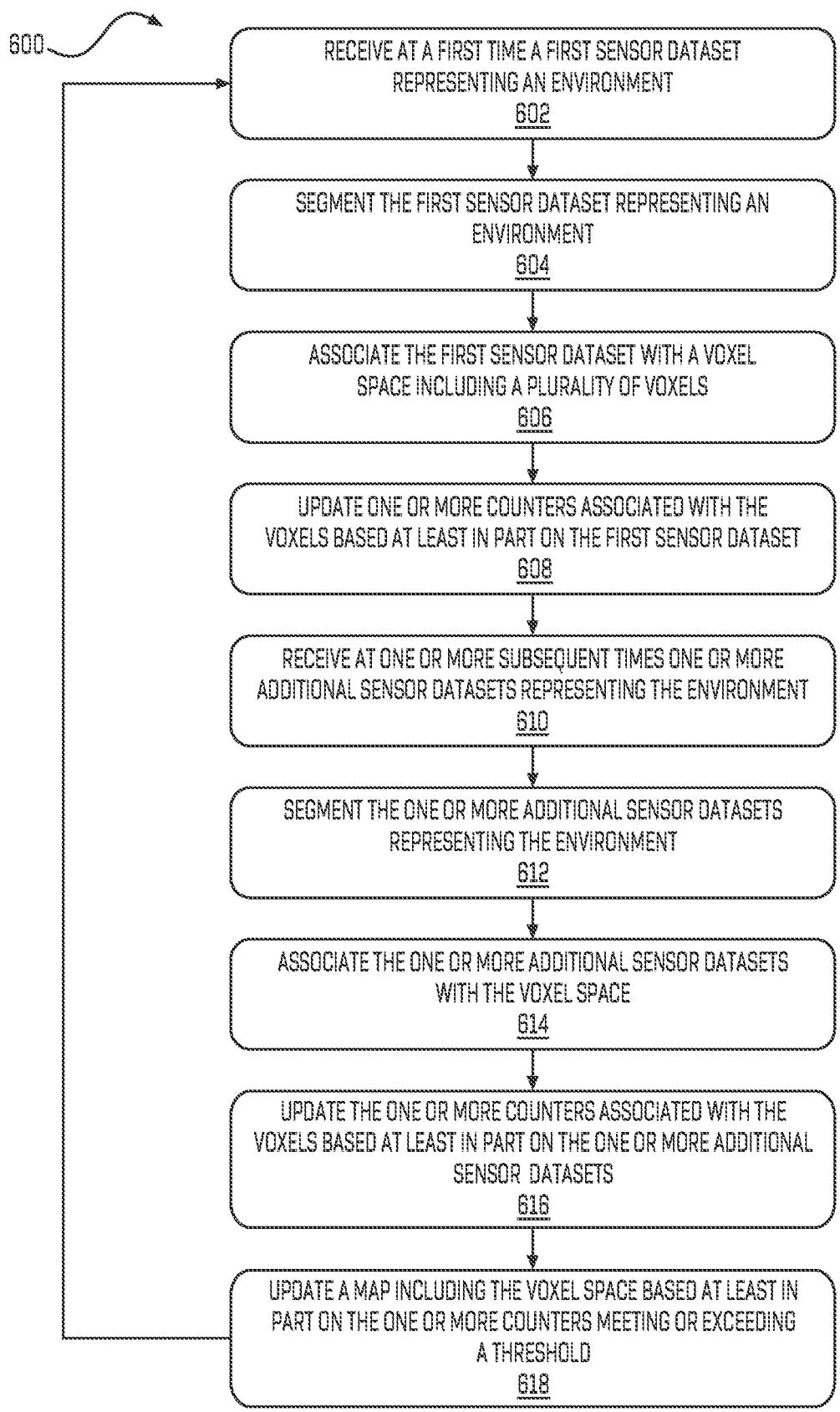
FIG. 6 is a flow diagram of an example process for updating a map.
Figure 7:
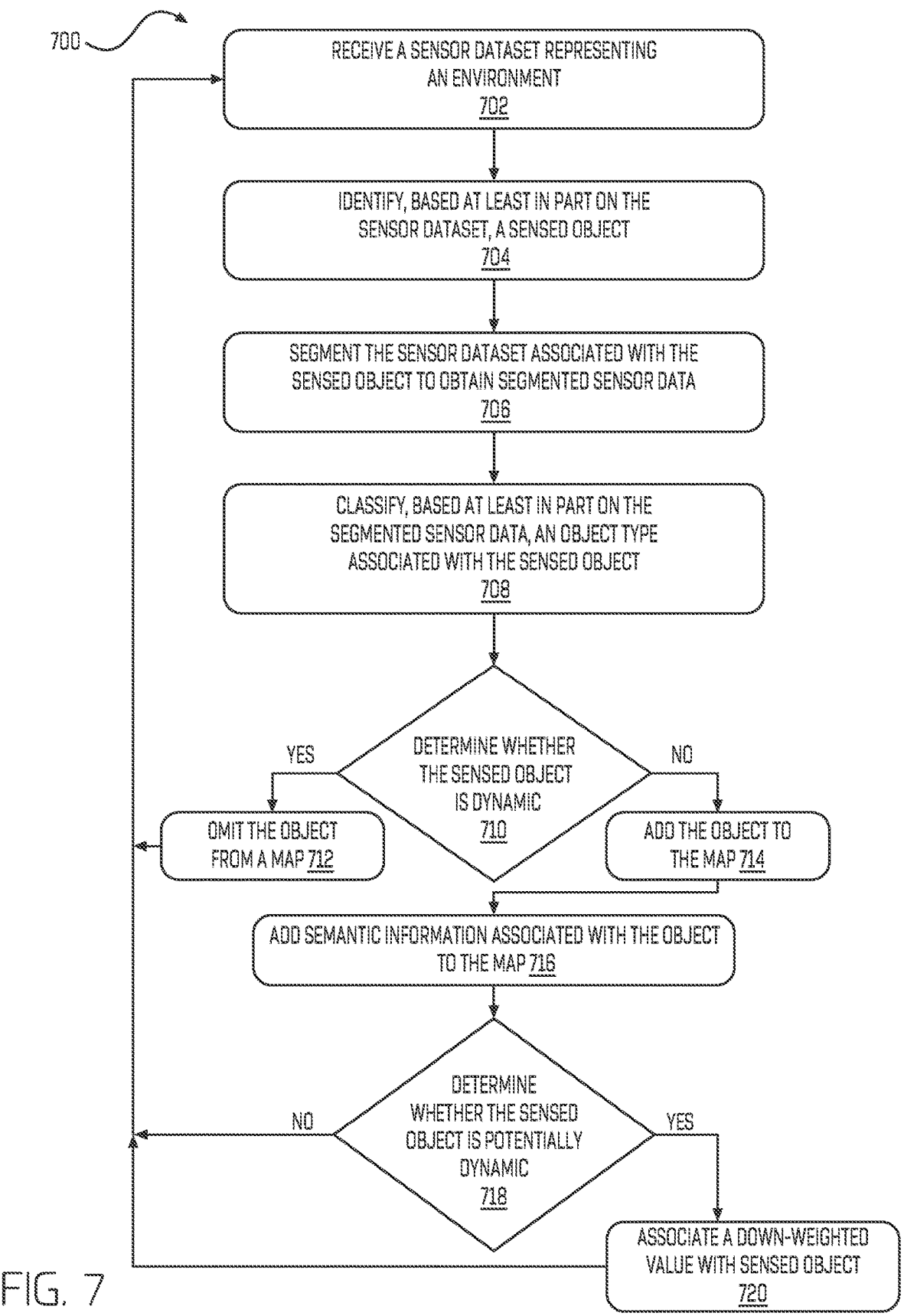
FIG. 7 is a flow diagram of another example process for updating and/or annotating a map.

FIGS. 6 and 7 are flow diagrams of example processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 6 is a flow diagram of an example process 600 for updating a map, such as, for example, creating a map and/or changing an existing map. At 602, the example process 600 may include receiving at a first time a first sensor dataset representing an environment. For example, the sensor may be a LIDAR sensor, and sensor dataset may include LIDAR sensor data. Other sensor types and datasets from such sensors are contemplated, such as, but not limited to, RADAR sensors, SONAR sensors, ultrasonic transducer(s), image sensors, and the like.

At 604, the example process 600 may also include segmenting the first sensor dataset according to a plurality of classifications. For example, the plurality of classifications may include one or more of a vehicle, a pedestrian, or a cyclist, and the process 600 may include removing from the first sensor dataset data associated with a subset of the plurality of classifications. In some examples, the subset of the plurality of classifications may be associated with a dynamic object or a potentially dynamic object, and the process 600 may include detecting a sensed object in the first sensor dataset, and classifying the sensed object as one of the subset of the plurality of classifications. Other classifications are contemplated. In some examples, the segmenting may include communicating the first sensor dataset to a machine learning model, such as, for example, a machine learning model described herein, and receiving, from the machine learning model, segmentation information, though any other segmentation process is contemplated. At 606, the process 600 may include associating the first sensor dataset with a voxel space including a plurality of voxels, for example, as described herein.

The process 600 in some examples, at 608, may include updating an occupancy state associated with the voxels based at least in part on the first sensor dataset. This may include, for example, updating (e.g., incrementing and/or decrementing) one or more counters associated with the voxels based at least in part on the first sensor dataset, for example, as described herein with respect to FIG. 5.

In some examples of the process 600, at 610, it may include receiving at one or more subsequent times one or more additional sensor datasets representing the environment. At 612, the process 600 may also include segmenting the one or more additional sensor datasets according to the plurality of classifications, for example, as described herein. At 614, the process 600, according to some examples, may include associating the one or more additional sensor datasets with the voxel space, and, at 616, updating an occupancy state associated with the voxels based at least in part on the one or more additional sensor datasets, which may, in some examples, include updating (e.g., incrementing and/or decrementing) the one or more counters, based at least in part on the one or more additional sensor datasets.

At 618, the process 600 may include updating a map including the voxel space based at least in part on the one or more counters meeting or exceeding one or more thresholds, for example, as described herein so as to indicate that the voxel is free space (occupied) or not-free space (unoccupied). In some examples of the process 600, updating the map may include adding semantic information of the first sensor dataset and the one or more additional sensor datasets to the map. In some examples, the process 600 may further include determining one or more of a position or an orientation of a vehicle based at least in part on the map, generating, based on the one or more of the position or the orientation of the vehicle, one or more trajectories for maneuvering the vehicle, and, in some examples, maneuvering the vehicle based at least in part on the one or more trajectories.

FIG. 7 is a flow diagram of an example process 700 for updating a map, such as for example, creating a map and/or changing an existing map. As noted herein, at least portions of the example process 600 may be combined with at least portions of the example process 700.

At 702, the example process 700 may include receiving a sensor dataset representing an environment. For example, one or more of any of the types of sensors described herein may generate the sensor dataset. The example process 700, at 704, may include identifying, based at least in part on the received sensor dataset, a sensed object, for example, as described herein.

At 706, the example process 700 may include segmenting the sensor dataset to obtain segmented sensor data associated with the sensed object. For example, the sensor dataset may be segmented by, for example, processes described herein using machine learning. At 708, the example process 700 may also include classifying, based at least in part on the segmented sensor data, the sensed object as one of a dynamic object or a potentially dynamic object.

The example process 700, at 710, following classification of the object, may include determining whether the object is a dynamic object. If the object is a dynamic object, at 712, the process 700 may include determining not to include data associated with the object in a map, such as a map being created or an existing map. In some examples, thereafter, the process 700 may include returning to 702 to repeat at least some of the above-noted actions. If, on the other hand, the object is not dynamic, the process 700, at 714 may include adding the object to the map, for example, as described herein.

In some examples, at 716, the example process 700 may include adding semantic information associated with the object to the map, for example, as described herein. As a non-limiting example, object classifications may be associated with each of the one or more voxels.

At 718, the example process 700 may include determining whether the sensed object is potentially dynamic. For example, the sensed object may be vegetation, such as a tree or bush, which may change appearance and/or location over time. If the sensed object is potentially dynamic, at 720, the process may include associating a down-weighted value with the sensed object in the map, which may be used when, for example, an autonomous vehicle is determining its local pose based on the sensor datasets generated by its sensors and a map. For example, a value may be associated with a respective object in a map, and the value may correlate to a relative weight for use in localizing the autonomous vehicle. A potentially dynamic object, for example, may be associated with a value lower than a value associated with a static object, and an algorithm used to determine local pose may use the values when determining the local pose (e.g. relying less heavily on those data with lower weights). In this example manner, the values may improve the accuracy of the local pose determination. For example, the relative effect of the down-weighted value associated with an object on determining pose and/or during navigation may be reduced as compared to static objects, such as the road surface, curbing, buildings, etc., which may have a relatively higher value than the down-weighted value. If the sensed object is not potentially dynamic, thereafter, in some examples, the process 700 may include returning to 702 to repeat at least some of the above-noted actions.

Figure 8:
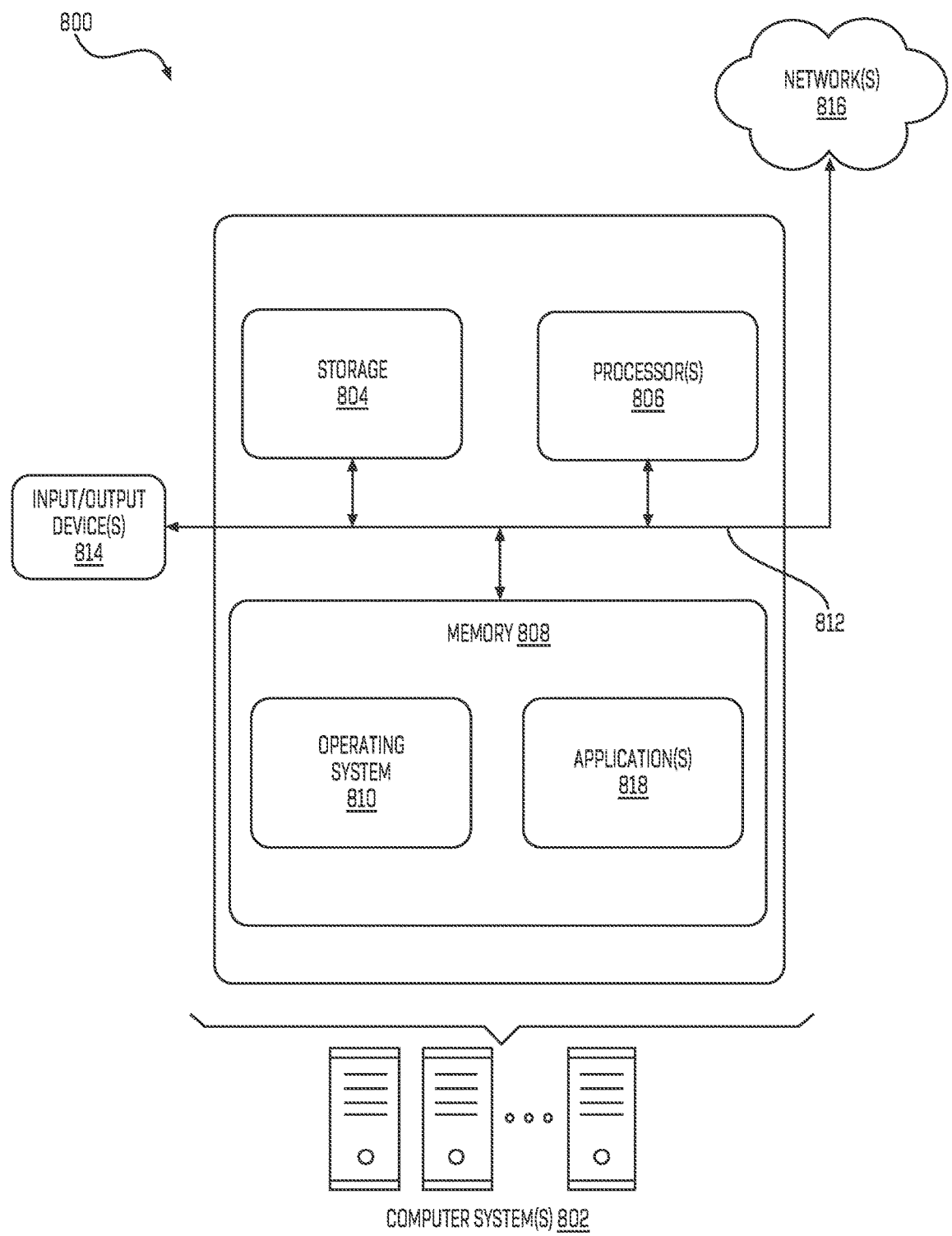
FIG. 8 is a block diagram of an example computer architecture for implementing the example processes described herein.

FIG. 8 is a block diagram of an example computer architecture 800 for implementing processes described herein. The example, architecture 800 includes one or more computer systems 802 that may include a storage 804, one or more processor(s) 806, and a memory 808 including an operating system 810. The storage 804, the processor(s) 806, the memory 808, and the operating system 810 may be communicatively coupled over a communication infrastructure 812. In some examples, the computer system(s) 802 may interact with a user, or environment, via input/output (I/O) device(s) 814, as well as one or more other computing devices over one or more networks 716, via the communication infrastructure 812. The operating system 810 may interact with other components to control one or more applications 818 in the memory 808.

In some examples, the computer system(s) 802 may correspond to the computer system(s) 302 of FIG. 3. The computer system(s) 302 may implement any hardware and/or software to implement the components 304-322 to perform one or more of the processes discussed herein.

The systems and methods described herein may be implemented in software or hardware or any combination thereof. The systems and methods described herein may be implemented using one or more computing devices, which may or may not be physically or logically separate from each other. The methods may be performed by components arranged as either on-premise hardware, on-premise virtual systems, or hosted-private instances. Additionally, various aspects of the methods described herein may be combined or merged into other functions.

A processor or computer system may be configured to particularly perform some or all of the methods described herein. In some examples, the methods may be partially- or fully-automated by one or more computers or processors. The systems and methods described herein (or any part(s) or function(s) thereof) may be implemented using hardware, software, firmware, or a combination thereof and may be implemented in one or more computer systems or other processing systems. In some examples, the illustrated system elements may be combined into a single hardware device or separated into multiple hardware devices. If multiple hardware devices are used, the hardware devices may be physically located proximate to or remotely from each other. The examples of the methods described and illustrated are intended to be illustrative and not limiting. For example, some or all of the steps of the methods may be combined, rearranged, and/or omitted in different examples.

In some examples, the systems and methods described herein may be directed to one or more computer systems capable of carrying out the functionality described herein. Example computing devices may be, but are not limited to, a personal computer (PC) system running any operating system, such as, but not limited to, OS X™, iOS™, Linux™ Android™, and Microsoft™ Windows™. However, the systems and methods described herein may not be limited to these platforms. Instead, the systems and methods described herein may be implemented on any appropriate computer system running any appropriate operating system. Other components of the systems and methods described herein, such as, but not limited to, a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, for example, but not limited to, an interactive television (iTV), a video on demand system (VOD), and via a digital video recorder (DVR), or other on demand viewing system.

The systems described herein may include one or more processors. The processor(s) may be connected to a communication infrastructure, such as, but not limited to, a communications bus, cross-over bar, or network, etc. The processes and processors need not be located at the same physical locations. In other words, processes may be executed at one or more geographically distant processors, over for example, a LAN or WAN connection. Computing devices may include a display interface that may forward graphics, text, and other data from the communication infrastructure for display on a display unit.

The computer system, in some examples, may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or write to a removable storage unit. As may be appreciated, the removable storage unit may include a computer usable storage medium having stored therein computer software and/or data. In some examples, a machine-accessible medium may refer to any storage device used for storing data accessible by a computer. Examples of a machine-accessible medium may include, but are not limited to, a magnetic hard disk; a floppy disk; an optical disk, at least similar to a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices may include, as non-limiting examples, magnetic disks (including internal hard disks and removable disks), magneto-optical disks, optical disks, read-only memory, random access memory, and/or flash storage. Storage devices suitable for tangibly embodying computer program instructions and data may also include all forms of non-volatile memory, including, for example, semiconductor memory devices, such as EPROM, EEPROM, and flash memory devices; magnetic disks, such as internal hard disks and removable disks; magneto-optical disks; and CD-ROM and DVD-ROM discs. The processor and the memory may be supplemented by, or incorporated in, ASICs (application-specific integrated circuits).

The processing system may be in communication with a computerized data storage system. The data storage system may include a non-relational or relational data store, such as a MySQL™ or other relational database. Other physical and logical database types may be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some examples, the processing system may use object-oriented programming and may store data in objects. In such examples, the processing system may use an object-relational mapper (ORM) to store the data objects in a relational database. The systems and methods described herein may be implemented using any number of physical data models. In some examples, a relational database management system (RDBMS) may be used. In such examples, tables in the RDBMS may include columns that represent coordinates. Data may be stored in tables in the RDBMS. The tables may have pre-defined relationships between them. The tables may also have adjuncts associated with the coordinates.

In some examples, secondary memory may include other similar devices for allowing computer programs or other instructions to be loaded into computer systems. Such devices may include, for example, a removable storage unit and an interface. Examples of such may include a program cartridge and cartridge interface (such as, for example, but not limited to, those found in video game devices), a removable memory chip (such as, for example, but not limited to, an erasable programmable read only memory (EPROM), or programmable read only memory (PROM) and associated socket), and other removable storage units and interfaces, which may allow software and data to be transferred from the removable storage unit to the computer system.

The computing system may also include an input device, such as, but not limited to, a voice input device, such as a microphone, touch screens, gesture recognition devices, such as cameras, other natural user interfaces, a mouse or other pointing device, such as a digitizer, and a keyboard or other data entry device. The computer system may also include output devices, such as, but not limited to, a display and a display interface. The computing system may include input/output (I/O) devices, such as, but not limited to, a communications interface, cable and communications path, etc. These devices may include, but are not limited to, a network interface card and modems. Communications interface(s) may allow software and data to be transferred between a computer system and one or more external devices.

In some examples, the computer system may be operatively coupled to an automotive system. Such an automotive system may be either manually operated, semi-autonomous, or fully autonomous. In such examples, input and output devices may include one or more image capture devices, controllers, microcontrollers, and/or other processors to control automotive functions, such as, but not limited to, acceleration, braking, and steering. Further, communication infrastructure in such examples may also include a Controller Area Network (CAN) bus.

In some examples, the computer system may be operatively coupled to any machine vision-based system. For example, such machine vision-based systems may include, but are not limited to, manually operated, semi-autonomous, or fully autonomous industrial or agricultural robots, household robots, inspection systems, security systems, etc. For example, the examples described herein are not limited to one particular context and may be applicable to any application utilizing machine vision.

Some examples may be practiced in the environment of a computer network or networks. The network may include a private network or a public network (e.g., the Internet), or a combination of both. The network may include hardware, software, or a combination of both.

From a telecommunications-oriented view, the network may be described as a set of hardware nodes interconnected by a communications facility, with one or more processes (hardware, software, or a combination thereof) functioning at each node. The processes may inter-communicate and exchange information with one another via communication pathways between them using interprocess communication pathways. On these pathways, appropriate communications protocols may be used.

An example computer and/or telecommunications network environment may include nodes, which may include hardware, software, or a combination of hardware and software. The nodes may be interconnected via a communications network. Each node may include one or more processes executable by processors incorporated into the nodes. A single process may be run by multiple processors, or multiple processes may be run by a single processor, for example. Additionally, each of the nodes may provide an interface point between the network and the outside world, and may incorporate a collection of sub-networks.

In some examples, the processes may communicate with one another through interprocess communication pathways supporting communication through any communications protocol. The pathways may function in sequence or in parallel, continuously or intermittently. The pathways may use any of the communications standards, protocols or technologies, described herein with respect to a communications network, in addition to standard parallel instruction sets used by many computers.

The nodes may include any entities capable of performing processing functions. Examples of such nodes that may be used with the examples herein may include computers (such as personal computers, workstations, servers, or mainframes), handheld wireless devices and wireline devices (such as personal digital assistants (PDAs), modem cell phones with processing capability, wireless e-mail devices, including but not limited to BlackBerry™ devices), document processing devices (such as scanners, printers, facsimile machines, or multifunction document machines), or complex entities (such as local-area networks or wide-area networks), to which are connected a collection of processors, as described. For example, a node itself may be a wide-area network (WAN), a local-area network (LAN), a private network (such as a Virtual Private Network (VPN)), or a collection of networks.

Communications between the nodes may be made possible by a communications network. A node may be connected either continuously or intermittently with the communications network. As an example, a communications network may be a digital communications infrastructure providing adequate bandwidth and information security.

The communications network may include wireline communications capability, wireless communications capability, or a combination of both, at any frequencies, using any type of standard, protocol, or technology. In addition, in some examples, the communications network may be a private network (e.g., a VPN) or a public network (e.g., the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An example, non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP), and user datagram protocol (UDP). Any other known or anticipated wireless or wireline protocols and technologies may be used.

Examples disclosed herein may include apparatuses for performing the operations described herein. An apparatus may be specially constructed for the desired purposes, or it may include a general purpose device selectively activated or reconfigured by a program stored in the device.

Some examples may be embodied in machine-executable instructions. The instructions may be used to cause a processing device, for example, a general-purpose or special-purpose processor, which is programmed with instructions to perform the steps of the processes described herein. Alternatively, the steps of the described herein may be performed by specific hardware components that contain hardwired logic for performing the steps, or by any combination of programmed computer components and custom hardware components. For example, the systems and processes described herein may be provided as a computer program product, as outlined above. Some examples may include a machine-readable medium having instructions stored thereon. The instructions may be used to program any processor or processors (or other electronic devices) to perform a process or method according to the examples described herein. In addition, some examples may be downloaded and stored on a computer program product. In such examples, the program may be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The processes may be implemented in a computer program product accessible from a computer-usable or computer-readable storage medium that provides program code for use by, or in connection with, a computer or any instruction execution system. A computer-usable or computer-readable storage medium may be any apparatus that is capable of containing or storing the program for use by, or in connection with, the computer or instruction execution system, apparatus, or device.

A data processing system suitable for storing and/or executing the corresponding program code may include at least one processor coupled directly or indirectly to computerized data storage devices, such as memory elements. Input/output (I/O) devices, including, but not limited to, keyboards, displays, pointing devices, etc., may be coupled to the system. Network adapters may also be coupled to the system to enable the data processing system to become coupled to other data processing systems or remote printers or storage devices through intervening private or public networks. To provide for interaction with a user, the features may be implemented on a computer with a display device, such as an LCD (liquid crystal display) or another type of monitor for displaying information to the user, and a keyboard and an input device, such as a mouse or trackball, by which the user may provide input to the computer.

A computer program may be a set of instructions that may be used, directly or indirectly, in a computer. The systems and methods described herein may be implemented using programming languages, such as, for example, CUDA, OpenCL, Flash™, JAVA™ C++, C, C #, Python, Visual Basic™, JavaScript™ PHP, XML, HTML, etc., or a combination of programming languages, including compiled or interpreted languages, and may be deployed in any form, including as a stand-alone program or as a module, component, subroutine, or other unit suitable for use in a computing environment. The software may include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™ iOS™, Unix™/X-Windows™, Linux™, etc. The system may be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device, such as a read-only memory, a random-access memory, both, or any combination of the data storage devices described herein. A processor may include any processing circuitry or control circuitry operative to control the operations and performance of an electronic device.

The systems, components, and methods described herein may be implemented using any combination of software or hardware elements. The systems, components, and methods described herein may be implemented using one or more virtual machines operating alone or in combination with one other. Any applicable virtualization solution may be used for encapsulating a physical computing machine platform into a virtual machine that is executed under the control of virtualization software running on a hardware computing platform or host. The virtual machine may have both virtual system hardware and guest operating system software.

The systems and methods described herein may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication, such as a communication network. Examples of communication networks include, for example, a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

It should be appreciated that the subject matter presented herein may be implemented as a computer process, a computer-controlled apparatus, a computing system, or an article of manufacture, such as a computer-readable storage medium. While the subject matter described herein is presented in the general context of program components that execute on one or more computing devices, those skilled in the art will recognize that other implementations may be performed in combination with other types of program components. Generally, program components include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, mobile telephone devices, tablet computing devices, special-purposed hardware devices, network appliances, and the like.

Based on the foregoing, it should be appreciated that technologies for operating the systems and implementing the processes have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

EXAMPLE CLAUSES

A. An example system for charging one or more batteries of a vehicle, the system comprising:
one or more electrically conductive contacts configured to be accessible from under the vehicle, the
A. An example system comprising:
one or more processors; and
one or more computer readable storage media communicatively coupled to the one or more processors and storing instructions that are executable by the one or more processors to:
receive at a first time a first sensor dataset representing an environment;
segment the first sensor dataset according to a plurality of classifications;
associate the sensor dataset with a voxel space comprising a plurality of voxels;
update one or more counters associated with the voxels, based at least in part on the first sensor dataset;
receive at one or more additional times one or more additional sensor datasets representing the environment;
segment the one or more additional sensor datasets according to the plurality of classifications;
associate the one or more additional sensor datasets with the voxel space;
update the one or more counters, based at least in part on the one or more additional sensor datasets; and
update a map comprising the voxel space based at least in part on the one or more counters meeting or exceeding a first threshold.

B. The system of example A, wherein:
the plurality of classifications comprises one or more of a vehicle, a pedestrian, or a cyclist; and
the instructions are further executable by the one or more processors to:
remove from the first sensor dataset and the one or more additional sensor datasets data associated with a subset of the plurality of classifications.

C. The system of example A or B, wherein segmenting the first sensor dataset and the one or more additional sensor datasets comprises:
passing the one or more sensor datasets as input into a machine learned model; and
receiving, from the machine learned model, segmented sensor data.

D. The system of any one of example A through example C, wherein the instructions are further executable by the one or more processors to:
raycast the one or more additional datasets into the voxels as one or more rays;
determine one or more pass-through voxels though which the one or more rays pass;
update the one or more counters associated with the pass-through voxels; and
determine the one or more counters associated with the pass-through voxels do not meet or exceed a second threshold; and
associate the one or more pass-through voxels as non-occupied voxels.

E. The system of any one of example A through example D, wherein the instructions are further executable by the one or more processors to:
segment a second sensor dataset of the one or more additional sensor datasets;
determine a first object in the second sensor dataset;
determine, based at least in part on the segmented second sensor dataset, the first object is a static object, the first object associated with a first classification;
determine a first weight associated with the first object;
determine a second object in the segmented second sensor dataset;
determine, based at least in part on the segmented second sensor dataset, the second object is a dynamic object or a potentially dynamic object, the second object associated with a second classification; and
determine a second weight associated with the second object, the second weight lower than the first weight.

F. The system of any one of example A through example E, wherein the instructions are further executable by the one or more processors to associate semantic information with the map.

G. The system of any one of example A through example F, wherein receiving the first sensor dataset comprises receiving the first sensor dataset from one or more of a light detection and ranging (LIDAR) sensor, a radio detection and ranging (RADAR) sensor, a sound navigation and ranging (SONAR) sensor, or one or more imagers.

H. The system of any one of example A through example G, wherein the instructions are further executable by the one or more processors to:
receive a third sensor dataset of the one or more additional sensor datasets at a third time;
segment the third sensor dataset according to the plurality of classifications;
create a subset of data by removing, from the third sensor dataset, data associated with a subset of the classifications; and
localize an autonomous vehicle based at least in part on the map and the subset of sensor data.

I. An example method comprising:
receiving a first sensor dataset representing an environment from one or more sensors;
segmenting the first sensor dataset according to a plurality of classifications;
associating the first sensor dataset with a voxel space comprising a plurality of voxels;
updating an occupancy state associated with the voxels, based at least in part on the first sensor dataset;
receiving one or more additional sensor datasets representing the environment;
segmenting the one or more additional sensor datasets according to the plurality of classifications;
associating the one or more additional sensor datasets with the voxel space;
updating an occupancy state associated with the voxels, based at least in part on the one or more additional sensor datasets; and
updating a map comprising the voxel space based at least in part on the occupancy state associated with the voxels.

J. The method of example I, wherein the plurality of classifications comprises one or more of a vehicle, a pedestrian, or a cyclist, the method further comprising:

removing from the first sensor dataset and the one or more additional datasets data associated with a subset of the plurality of classifications.

K. The method of example I or example J, wherein the segmenting comprises:

communicating the first sensor dataset and the one or more additional sensor datasets into a machine learning model; and receiving, from the machine learning model, segmentation information.

L. The method of any one of example I through example K, wherein the subset of the plurality of classifications is associated with a dynamic object or a potentially dynamic object, the method further comprising:

detecting a sensed object in the first sensor dataset; and classifying the sensed object as one of the subset of the plurality of classifications.

M. The method of any one of example I through example L, further comprising:

associating a first weight with the subset of the plurality of classifications; and associating a second weight with a remainder of the classifications, the second weight greater than the first weight.

N. The method of any one of example I through example M, further comprising adding semantic information of the first sensor dataset and the one or more additional sensor datasets to the map.

O. The method of any one of example I through example N, further comprising:

determining one or more of a position or an orientation of a vehicle based at least in part on the map;

generating, based on the one or more of the position or the orientation of the vehicle, one or more trajectories for maneuvering the vehicle; and maneuvering the vehicle based at least in part on the one or more trajectories.

P. An example computer-readable storage medium having computer-executable instructions stored thereupon which, when executed by a computer, cause the computer to:

receive, from one or more sensors, a sensor first dataset representing an environment;

determine a presence of an object in the first sensor dataset;

associate the object with a classification as one or more of a plurality of classifications;

associate the first sensor dataset with a voxel space comprising a plurality of voxels;

increment one or more counters associated with the voxels based at least in part on the object;

update a map comprising the voxel space based on voxels having a counter greater than a threshold; and generate, based at least in part on the updated map, one or more trajectories for maneuvering a vehicle.

Q. The computer-readable storage medium of example P, wherein the instructions further cause the computer to:

determine the presence of the object in the one or more voxels at one or more subsequent times;

determine an object track of the object; and maneuver the vehicle based at least in part on the object track.

R. The computer-readable storage medium of example P or example Q, wherein the classification comprises a classification associated with a static object, and wherein the instructions further cause the computer to:

receive at a second time a second sensor dataset representing the environment;

associate the second sensor dataset with the voxels;

raycast, as one or more rays, the second sensor dataset into the voxels;

determine one or more pass-through voxels, the pass-through voxels comprising the voxels through which the one or more rays pass;

decrement the one or more counters associated with the pass-through voxels; and remove from the map data associated with voxels having a counter that does not meet or exceed a second threshold.

S. The computer-readable storage medium of any one of example P through example R, wherein the plurality of classifications comprises one or more of a vehicle, a pedestrian, or a cyclist, and wherein the instructions further cause the computer to:

associate a weight with the classification;

associate the weight with the map; and associate the classification of the object with the map, wherein the weight is greater for static objects and lower for dynamic objects.

T. The computer-readable storage medium of any one of example P through example S, wherein the one or more sensors comprise one or more of a LIDAR sensor, a RADAR sensor, a SONAR sensor, or an image sensor.

What is claimed is:

1. A system comprising:

one or more processors; and one or more computer readable storage media communicatively coupled to the one or more processors and storing instructions that are executable by the one or more processors to:

receive at a first time a first sensor dataset representing an environment;

segment the first sensor dataset according to a plurality of classifications into a segmented first sensor dataset, the plurality of classifications comprising one or more of a vehicle, a pedestrian, or a cyclist;

associate the segmented first sensor dataset with a voxel space comprising a plurality of voxels;

update one or more counters associated with the plurality of voxels, based at least in part on the segmented first sensor dataset;

receive at one or more additional times one or more additional sensor datasets representing the environment;

segment the one or more additional sensor datasets according to the plurality of classifications into one or more additional segmented sensor datasets;

associate a portion of the one or more additional segmented sensor datasets excluding the plurality of classifications with the voxel space;

update the one or more counters, based at least in part on the one or more additional segmented sensor datasets; and update a map comprising the voxel space based at least in part on the one or more counters meeting or exceeding a first threshold.

2. The system of claim 1, wherein:

the instructions are further executable by the one or more processors to:

remove, from the segmented first sensor dataset, data associated with a subset of the plurality of classifications.

3. The system of claim 1, wherein segmenting the first sensor dataset and the one or more additional sensor datasets comprises:

passing one or more sensor datasets as input into a machine learned model; and
receiving, from the machine learned model, segmented sensor data.

4. The system of claim 1, wherein the instructions are further executable by the one or more processors to:
raycast the one or more additional datasets into the voxels as one or more rays;
determine one or more pass-through voxels though which the one or more rays pass;
update the one or more counters associated with the pass-through voxels; and
determine the one or more counters associated with the pass-through voxels do not meet or exceed a second threshold; and
associate the one or more pass-through voxels as non-occupied voxels.

5. The system of claim 2, wherein the instructions are further executable by the one or more processors to:
segment a second sensor dataset of the one or more additional sensor datasets into a segmented second dataset;
determine a first object in the second sensor dataset;
determine, based at least in part on the segmented second sensor dataset, the first object is a static object, the first object associated with a first classification;
determine a first weight associated with the first object;
determine a second object in the segmented second sensor dataset;
determine, based at least in part on the segmented second sensor dataset, the second object is a dynamic object or a potentially dynamic object, the second object associated with a second classification; and
determine a second weight associated with the second object, the second weight lower than the first weight.

6. The system of claim 3, wherein the instructions are further executable by the one or more processors to associate semantic information with the map.

7. The system of claim 1, wherein the instructions are further executable by the one or more processors to:
receive a third sensor dataset of the one or more additional sensor datasets at a third time;
segment the third sensor dataset according to the plurality of classifications;
create a subset of sensor data by removing, from the third sensor dataset, data associated with a subset of the classifications; and
localize an autonomous vehicle based at least in part on the map and the subset of sensor data.

8. A method comprising:
receiving a first sensor dataset representing an environment from one or more sensors;
segmenting the first sensor dataset according to a plurality of classifications into a segmented first sensor dataset, the plurality of classifications comprising one or more of a vehicle, a pedestrian, or a cyclist;
associating the segmented first sensor dataset with a voxel space comprising a plurality of voxels;
updating an occupancy state associated with the voxels, based at least in part on the first sensor dataset;
receiving one or more additional sensor datasets representing the environment;
segmenting the one or more additional sensor datasets according to the plurality of classifications into one or more additional segmented sensor datasets;
associating a portion of the one or more additional segmented sensor datasets excluding the plurality of classifications with the voxel space;
updating an occupancy state associated with the voxels, based at least in part on the one or more additional sensor datasets; and
updating a map comprising the voxel space based at least in part on the occupancy state associated with the voxels.

9. The method of claim 8, further comprising:
removing, from the segmented first sensor dataset, data associated with a subset of the plurality of classifications.

10. The method of claim 8, wherein the segmenting comprises:
communicating the first sensor dataset and the one or more additional sensor datasets into a machine learning model; and
receiving, from the machine learning model, segmentation information.

11. The method of claim 9, wherein the subset of the plurality of classifications is associated with a dynamic object or a potentially dynamic object, the method further comprising:
detecting a sensed object in the first sensor dataset; and
classifying the sensed object as one of the subset of the plurality of classifications.

12. The method of claim 9, further comprising:
associating a first weight with the subset of the plurality of classifications; and
associating a second weight with a remainder of the classifications, the second weight greater than the first weight.

13. The method of claim 10, further comprising adding semantic information of the first sensor dataset and the one or more additional sensor datasets to the map.

14. The method of claim 8, further comprising:
determining one or more of a position or an orientation of a vehicle based at least in part on the map;
generating, based on the one or more of the position or the orientation of the vehicle, one or more trajectories for maneuvering the vehicle; and
maneuvering the vehicle based at least in part on the one or more trajectories.

15. A non-transitory computer-readable storage medium having computer-executable instructions stored thereupon which, when executed by a computer, cause the computer to:
receive, from one or more sensors, a first sensor dataset representing an environment;
determine a presence of an object in the first sensor dataset;
associate the object with a classification as one or more of a plurality of classifications to define an associated object classification comprising one or more of a vehicle, a pedestrian, or a cyclist;
associate, based at least in part on the associated object classification, a portion of the first sensor dataset excluding the plurality of classifications with a voxel space comprising a plurality of voxels;
increment one or more counters associated with the plurality of voxels based at least in part on the object;
update a map comprising the voxel space based on voxels having a counter greater than a threshold; and
generate, based at least in part on the map as updated, one or more trajectories for maneuvering a vehicle.

16. The non-transitory computer-readable storage medium of claim 15, wherein the instructions further cause the computer to:
- determine the presence of the object in one or more voxels at one or more subsequent times;
- determine an object track of the object; and
- maneuver the vehicle based at least in part on the object track.

17. The non-transitory computer-readable storage medium of claim 15, wherein the classification comprises a classification associated with a static object, and wherein the instructions further cause the computer to:
- receive at a second time a second sensor dataset representing the environment;
- associate the second sensor dataset with the voxels;
- raycast, as one or more rays, the second sensor dataset into the voxels;
- determine one or more pass-through voxels, the pass-through voxels comprising the voxels through which the one or more rays pass;
- decrement the one or more counters associated with the pass-through voxels; and
- remove from the map associated with voxels having a counter that does not meet or exceed a second threshold.

18. The non-transitory computer-readable storage medium of claim 15, wherein the plurality of classifications comprises one or more of a vehicle, a pedestrian, or a cyclist, and wherein the instructions further cause the computer to:
- associate a weight with the classification;
- associate the weight with the map; and
- associate the classification of the object with the map,
- wherein the weight is greater for static objects and lower for dynamic objects.

19. The non-transitory computer-readable storage medium of claim 15, wherein the one or more sensors comprise one or more of a LIDAR sensor, a RADAR sensor, a SONAR sensor, or an image sensor.

20. The system of claim 1, wherein:
- segmenting the first sensor dataset according to the plurality of classifications comprises determining segmentation information; and
- associating the first sensor dataset with the voxel space comprising the plurality of voxels comprises associating the segmentation information with a portion of the first sensor dataset associated with the voxel space.

* * * * *